United States Patent
Hoshizuki et al.

(10) Patent No.: US 11,374,735 B2
(45) Date of Patent: Jun. 28, 2022

(54) PROCESSING APPARATUS, PROCESSING METHOD, STORAGE MEDIUM, AND ENCRYPTION PROCESSING SYSTEM

(71) Applicant: AXELL CORPORATION, Tokyo (JP)

(72) Inventors: Yusuke Hoshizuki, Tokyo (JP); Masashi Michigami, Tokyo (JP)

(73) Assignee: AXELL CORPORATION, Tokyo (JP)

( * ) Notice: Subject to any disclaimer, the term of this patent is extended or adjusted under 35 U.S.C. 154(b) by 860 days.

(21) Appl. No.: 16/227,212

(22) Filed: Dec. 20, 2018

(65) Prior Publication Data

US 2019/0199509 A1 Jun. 27, 2019

(30) Foreign Application Priority Data

Dec. 26, 2017 (JP) .............................. JP2017-248682

(51) Int. Cl.
| | |
|---|---|
| *H04L 9/00* | (2022.01) |
| *G06N 3/04* | (2006.01) |
| *G06N 3/08* | (2006.01) |
| *H04L 9/30* | (2006.01) |

(52) U.S. Cl.
CPC .............. *H04L 9/008* (2013.01); *G06N 3/04* (2013.01); *G06N 3/08* (2013.01); *H04L 9/302* (2013.01); *H04L 2209/12* (2013.01)

(58) Field of Classification Search
CPC ...................................................... H04L 9/008
See application file for complete search history.

(56) References Cited

U.S. PATENT DOCUMENTS

2011/0135096 A1* 6/2011 Rane ....................... H04L 9/008
380/278
2013/0148868 A1* 6/2013 Troncoso Pastoriza .....................
G06K 9/00885
382/118

(Continued)

OTHER PUBLICATIONS

Orlandi et al., "Oblivious Neural Network Computing via Homomorphic Encryption", EURASIP Journal on Information Security, vol. 2007, Article ID 37343, pp. 1-11 (2007).

*Primary Examiner* — Simon P Kanaan
(74) *Attorney, Agent, or Firm* — Wenderoth, Lind & Ponack, L.L.P.

(57) ABSTRACT

A processing apparatus includes at least one processor configured to function as: an input unit that receives encrypted data based on homomorphic encryption; and a process execution unit that executes a predetermined process by using the encrypted data while maintaining a secret state and includes one or more processing units. At least one of the processing units is a multiplication corresponding processing unit for executing a calculation corresponding to a processing of multiplying plaintext data by a predetermined multiplier. The multiplication corresponding processing unit generates a first calculation result based on a first multiplier component of the predetermined multiplier that is not used in a calculation of encrypted data, generates a second calculation result by executing a calculation to encrypted data in a ciphertext space corresponding to multiplication of the plaintext data by a second multiplier component of the predetermined multiplier other than the first multiplier component, and outputs the first calculation result and the second calculation result in association with each other.

13 Claims, 13 Drawing Sheets

(56) References Cited

U.S. PATENT DOCUMENTS

| | | | |
|---|---|---|---|
| 2013/0333051 A1* | 12/2013 | Takenouchi | G06F 21/60 |
| | | | 726/26 |
| 2014/0185797 A1* | 7/2014 | Yasuda | H04L 9/008 |
| | | | 380/44 |
| 2016/0350648 A1* | 12/2016 | Gilad-Bachrach | G06N 3/08 |
| 2017/0004324 A1* | 1/2017 | Seo | G06F 21/6227 |
| 2019/0386814 A1* | 12/2019 | Ahmed | H04L 9/3013 |
| 2020/0242466 A1* | 7/2020 | Mohassel | G06F 21/6254 |

* cited by examiner

PROCESSING APPARATUS, PROCESSING METHOD, STORAGE MEDIUM, AND ENCRYPTION PROCESSING SYSTEM

CROSS-REFERENCE TO RELATED APPLICATIONS

This application is based on and claims priority under 35 USC 119 from Japanese Patent Application No. 2017-248682 filed on Dec. 26, 2017, the entire content of which is incorporated herein by reference.

BACKGROUND

Technical Field

The embodiments discussed herein relate to a processing apparatus for processing information using homomorphic encryption.

Related Art

Recognition processing (inference processing) of images, characters, voices, and the like has been performed by using a neural network model (artificial neural network) which is one of architectures of machine learning.

Learned coefficient data in the neural network model has a large scale. There may be a problem that the load to execute a processing is too large and that it is difficult to execute the processing only with a client device. On the other hand, there is a need for using a client-server model to use cloud resources capable of large-scale computations for an inference processing or the like by using the neural network model.

When using the client-server model, data are transmitted from a client to a server. There may be concern about a leakage of highly confidential information such as personal information.

To address the above-mentioned matter, transmitting encrypted data to the server and processing the encrypted data on the server side by using homomorphic encryption that allows computation on ciphertext is conceivable.

However, general activation functions such as a sigmoid function and a Rectified Linear Unit (ReLU) used in the neural network model exceed categories of calculations which can be performed by the known homomorphic encryption. Thus, it is impossible to calculate the encrypted data based on the homomorphic encryption.

For example, PTL 1 discloses a technique relating to a neural network using an approximate polynomial as an activation function.

NPL 1 discloses a technique for realizing a process using homomorphic encryption by querying a client each time when calculating an activation function in a neural network model.

PTL 1: U.S. Patent Application Publication No. 2016/0350648

NPL 1: C. Orlandi, A. Piva, and M. Barni Research Article Oblivious Neural Network Computing via Homomorphic Encryption, Internet <http://clem.dii.unisi.it/~vipp/files/publications/S1687416107373439.pdf>

SUMMARY

In the neural network model, it may be difficult to process the encrypted data as it is, or a processing load may become large. For example, in the technique disclosed in NPL 1, exchange of data with the client and the process on the client side occurs every time the activation function is calculated, which results in an increasing communication volume and longer processing time.

In addition, using completely homomorphic encryption that is homomorphic encryptions capable of handling more calculations, somewhat homomorphic encryption, or the like may be considered. However, the encrypted data by such encryptions has a large amount of data, and thus, there is a problem that the processing load becomes large.

In terms of reducing the processing load, it is preferable to perform a process by using additive homomorphic encryption. However, in the case of using the additive homomorphic encryption, available calculations are limited, and thus the executable process is limited. For example, if the additive homomorphic encryption is used, a process for executing a process of multiplying by a number other than an integer (including, for example, multiplication of a number less than 1 (corresponding to division)) cannot be executed.

In addition, in a case where the process is performed by using the additive homomorphic encryption, there is a problem that the process that can be executed are not only limited in a process using the neural network model but also similarly limited in a process not using the neural network model.

An aspect of the present embodiments may provide a technique capable of executing a wider processing by using encrypted data based on homomorphic encryption.

According to an aspect of the embodiments, there is provided a processing apparatus including at least one processor configured to function as: an input unit that receives encrypted data based on homomorphic encryption as an input; and a process execution unit that executes a predetermined process by using the encrypted data while maintaining a secret state by encryption and to include one or more processing units, wherein at least one of the processing units is a multiplication corresponding processing unit for executing a calculation corresponding to a processing of multiplying plaintext data by a predetermined multiplier, the multiplication corresponding processing unit generates a first calculation result based on a first multiplier component of the predetermined multiplier, the first multiplier component being a component that is not used in a calculation of encrypted data, the multiplication corresponding processing unit generates a second calculation result by executing a calculation to encrypted data input in a ciphertext space corresponding to multiplication of the plaintext data by a second multiplier component of the predetermined multiplier, the second multiplier component being a component other than the first multiplier component, and the multiplication corresponding processing unit outputs the first calculation result and the second calculation result in association with each other.

In the processing apparatus, in a case where the first calculation result is input from a preceding stage, the multiplication corresponding processing unit may generate the first calculation result by multiplying the first calculation result input by the first multiplier component.

In the processing apparatus, the multiplication corresponding processing unit may execute calculations to each of plural pieces of the encrypted data, the calculations corresponding to the process of multiplying by the predetermined multiplier, and the multiplication corresponding processing unit may output plural second calculation results corresponding to the plural pieces of the encrypted data input from the preceding stage in association with the first calculation result.

In the processing apparatus, the first multiplier component may be a component of the predetermined multiplier to be used as a divisor.

In the processing apparatus, at least one of the processing units may be an addition corresponding processing unit for executing a calculation corresponding to a processing of addition of plaintext data, and, when executing a calculation corresponding to addition of plaintext data to a plurality of pieces of the encrypted data, the addition corresponding processing unit may specify a multiplier in a calculation of the plaintext data to which at least one piece of encrypted data is to be adjusted to have a first calculation result associated with one piece of the encrypted data and a first calculation result associated with another piece of the encrypted data to have a same value, execute a calculation corresponding to a multiplication of the plaintext data by the specified multiplier to each of the plurality of pieces of the encrypted data to obtain a plurality of second calculation results, execute a calculation corresponding to the addition of the plaintext data to the plurality of second calculation results, output the result of the calculation of the plurality of second calculation results, and output the same value as the first calculation result.

According to another aspect of the embodiments, there is provided a processing method by a processing apparatus for executing a predetermined process by using encrypted data based on homomorphic encryption as an input while maintaining a secret state by encryption, the processing method including: in executing a calculation corresponding to a processing of multiplying plaintext data by a predetermined multiplier, generating a first calculation result based on a first multiplier component of the predetermined multiplier, the first multiplier component being a component that is not used in a calculation of encrypted data, generating a second calculation result by executing a calculation to encrypted data input in a ciphertext space corresponding to multiplication of the plaintext data by a second multiplier component of the predetermined multiplier, the second multiplier component being a component other than the first multiplier component, and outputting the first calculation result and the second calculation result in association with each other.

According to another aspect of the embodiments, there is provided a non-transitory computer readable storage medium storing a processing program causing a computer to execute a process, for executing a predetermined process by using encrypted data based on homomorphic encryption as an input while maintaining a secret state by encryption to execute the process, the process including: in executing a calculation corresponding to a processing of multiplying plaintext data by a predetermined multiplier, generating a first calculation result based on a first multiplier component of the predetermined multiplier, the first multiplier component being a component that is not used in a calculation of encrypted data, generating a second calculation result by executing a calculation to encrypted data input in a ciphertext space corresponding to multiplication of the plaintext data by a second multiplier component of the predetermined multiplier, the second multiplier component being a component other than the first multiplier component, and outputting the first calculation result and the second calculation result in association with each other.

According to another aspect of the embodiments, there is provided an encryption processing system including: a processing apparatus for executing a predetermined process by using encrypted data based on homomorphic encryption as an input while maintaining a secret state by encryption; and a result generation apparatus for executing a process for generating a result corresponding to plaintext data by using a processing result by the processing apparatus as an input. The processing apparatus includes at least one processor configured to function as an input unit that receives the encrypted data, and a process execution unit that executes the predetermined process by using the encrypted data and to include one or more processing units at least one of which is a multiplication corresponding processing unit for executing a calculation corresponding to a process of multiplying the plaintext data by a predetermined multiplier, the multiplication corresponding processing unit generating a first calculation result based on a first multiplier component of the predetermined multiplier, the first multiplier component being a component that is not used in a calculation of encrypted data, generating a second calculation result by executing a calculation to encrypted data input in a ciphertext space corresponding to multiplication of the plaintext data by a second multiplier component of the predetermined multiplier, the second multiplier component being a component other than the first multiplier component, and outputting the first calculation result and the second calculation result in association with each other. The result generation apparatus includes at least one processor configured to function as a processing result reception unit that receives the processing result including a first processing result and a second processing result from the processing apparatus, a decryption unit that decrypts the second processing result, and a reflection processing unit that executes a reflection process for reflecting the first processing result on the plaintext data decrypted by the decryption unit.

According to the embodiments, a wider processing may be executed by using encrypted data based on homomorphic encryption.

DETAILED DESCRIPTION

Embodiments will be described with reference to the drawings. In addition, embodiments described below do not limit the invention according to the claims, and all elements and combination thereof described in the embodiments are not always essential.

First, a processing system according to an embodiment will be described.

Figure 1:
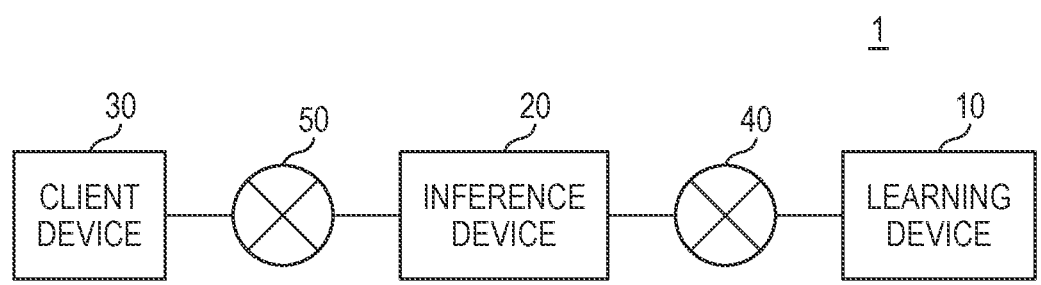
FIG. 1 is an overall configuration diagram illustrating a processing system according to an embodiment.

FIG. 1 is an overall configuration diagram illustrating the processing system according to the embodiment.

The processing system 1 is an example of an encryption processing system and includes a learning device 10, an inference device 20 as an example of a processing apparatus, and a client device 30 as an example of a result generation device. The learning device 10 and the inference device 20 are connected via a network 40. In addition, the inference device 20 and the client device 30 are connected via a network 50. The networks 40 and 50 are, for example, a local area network (LAN), a wide area network (WAN), or the like. In addition, in FIG. 1, the network 40 and the network 50 are separate networks, but the network 40 and the network 50 may be the same network.

The learning device 10 performs learning of a neural network model. The inference device 20 sets the neural network model based on the learning result (setting values such as coefficients (weights and biases) of the neural network model) of the neural network model by the learning device 10 and performs an inference processing. The client device 30 is, for example, a device used by a user, encrypts and transmits data (target data) to be subjected to the inference processing to the inference device 20, and receives the result (inference result) of the inference processing by the inference device 20.

Figure 2:
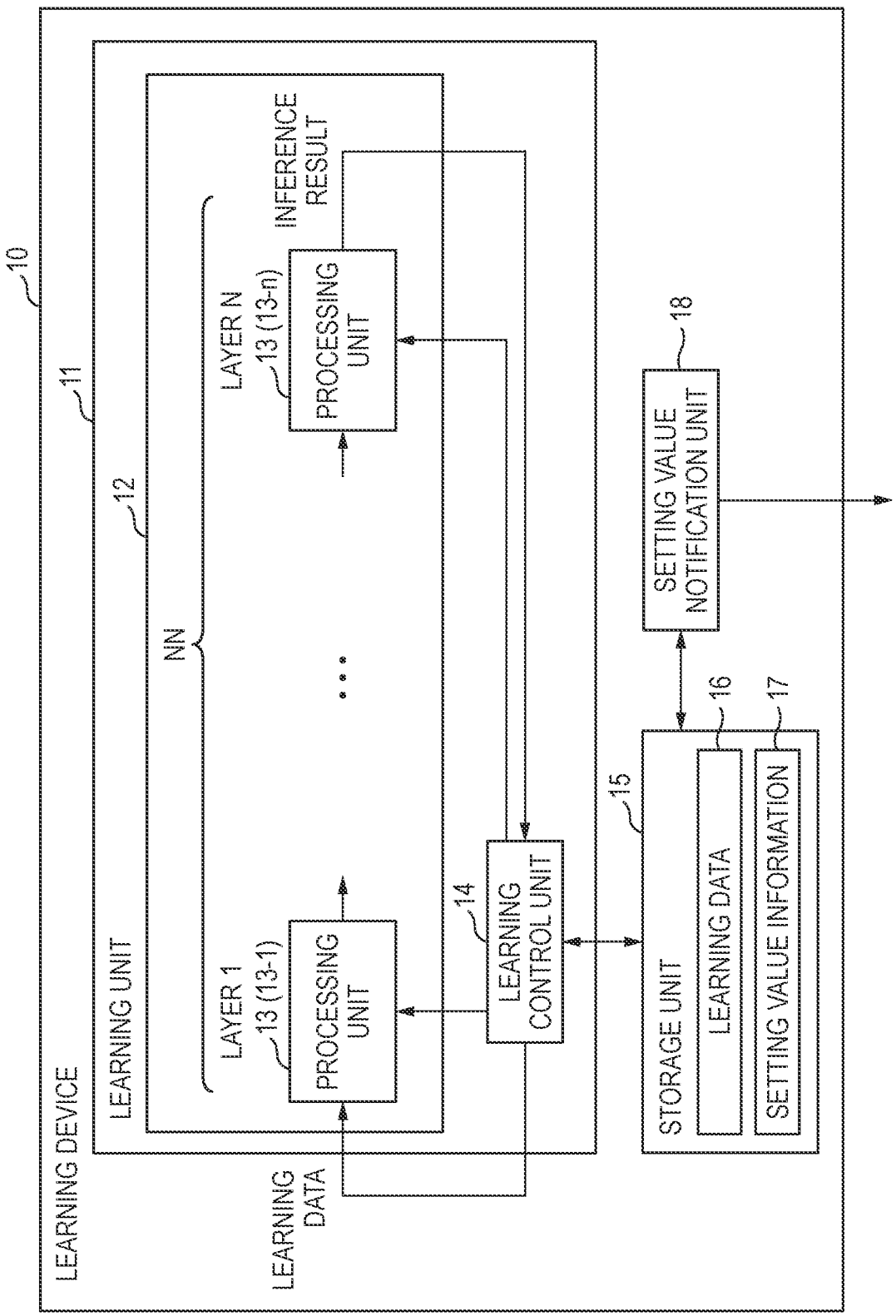
FIG. 2 is a functional configuration diagram illustrating a learning device according to the embodiment.

FIG. 2 is a functional configuration diagram of the learning device according to the first embodiment.

The learning device 10 includes a learning unit 11, a storage unit 15, and a setting value notification unit 18.

The learning unit 11 includes a neural network model 12 and a learning control unit 14.

The neural network model 12 is, for example, a neural network model for executing a predetermined inference processing and outputting the inference result. The neural network model 12 includes one or more processing layers (layers). In addition, in the embodiment, the neural network model 12 is used for learning of the setting values. In the example of FIG. 2, the neural network model 12 includes layers 1 to N (N is an integer of 1 or more). A process (partial process) in each layer is executed by each processing unit 13. The neural network model 12 may be, for example, a model of executing the inference processing for inferring what image data to be processed represents (for example, which of a person, a dog, a cat, and the like is included) and outputting the inference result. The number of layers in the neural network model 12 and the type and content of the partial process to be executed in each layer can be arbitrarily set.

As the processing unit 13 in the layer of the neural network model 12, for example, there are a convolution processing unit for performing a convolution process on input image data by using each of a plurality of pieces of filter data (an example of the setting values), an activation function unit for executing a process for converting input data by an activation function, a pooling processing unit for executing a process for down-sampling the input data, an affine processing unit for executing an affine conversion process on the input data, and a SoftMax processing unit for executing a process by a SoftMax function on the input data.

The learning control unit 14 receives learning data 16 stored in the storage unit 15, inputs the learning data 16 to the neural network model 12, and learns the setting values of the neural network model 12 based on the inference result output from the neural network model 12. When the learning by the learning data 16 is completed, the learning control unit 14 stores information on the setting values obtained by the learning in the storage unit 15.

The storage unit 15 stores the learning data 16 used for the learning of the neural network model 12 of the learning unit 11 and setting value information 17 that is information on the setting values such as the coefficients of the neural network model 12. In addition, the learning data 16 may be stored in the storage unit 15 as teacher data associated with the inference result data corresponding to the learning data 16. The learning data 16 may be, for example, unencrypted data (plaintext data). As the setting values included in the setting value information 17, there are, for example, coefficients of a filter used in the convolution processing unit, weights used in the affine processing unit, and the like, and these setting values are used, for example, as a multiplier in multiplication in the processing unit.

The setting value notification unit 18 transmits the setting value information 17 stored in the storage unit 15 to the inference device 20.

Next, the inference device 20 will be described in detail.

Figure 3:
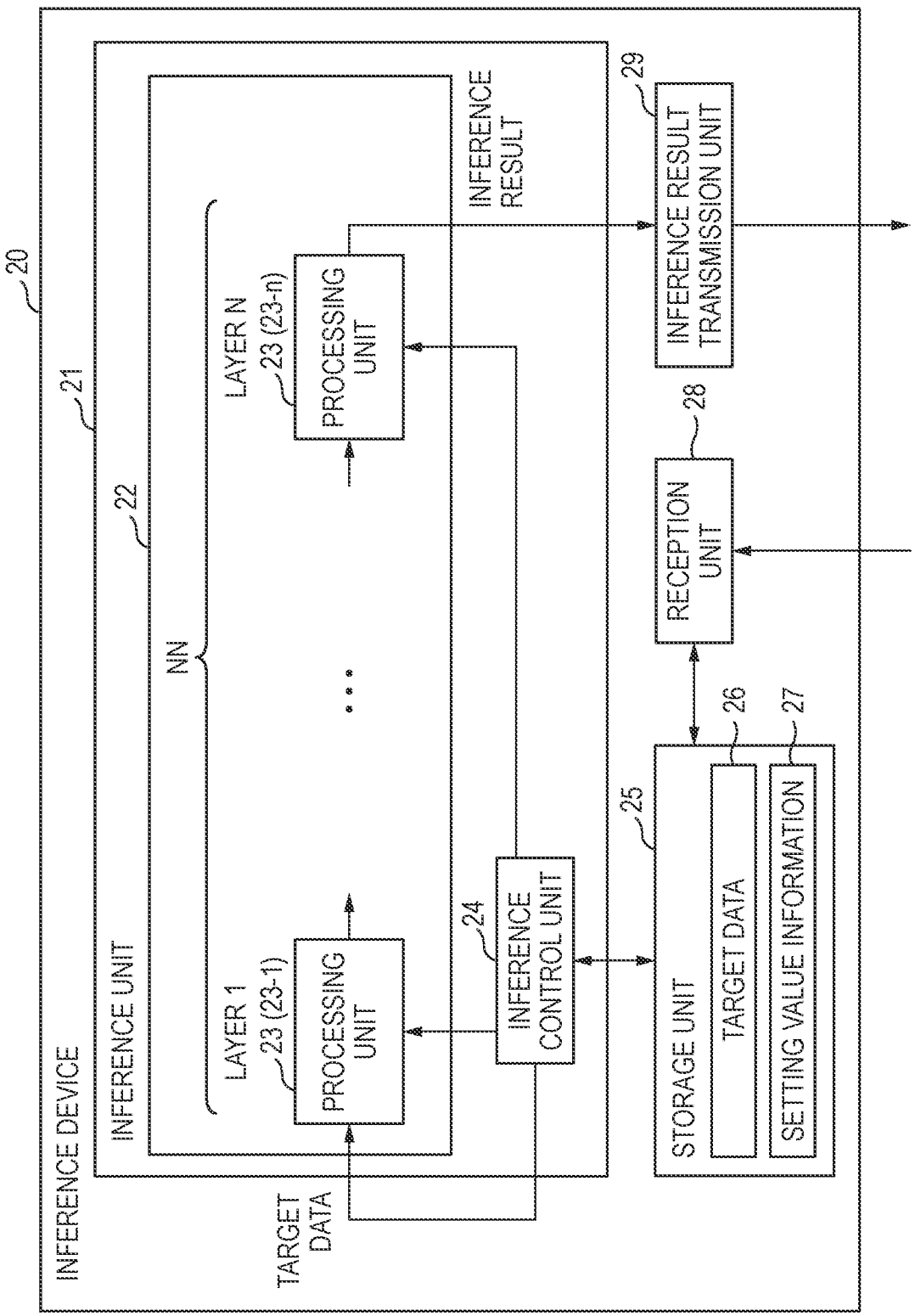
FIG. 3 is a functional configuration diagram illustrating an inference device according to the embodiment.

FIG. 3 is a functional configuration diagram of the inference device according to the embodiment.

The inference device 20 includes an inference unit 21 as an example of a process execution unit, a storage unit 25, a reception unit 28 as an example of an input unit, and an inference result transmission unit 29.

The inference unit 21 includes a neural network model 22 and an inference control unit 24.

The neural network model 22 is a neural network model for executing a predetermined inference processing by using encrypted data obtained by encryption based on additive homomorphic encryption (for example, Paillier encryption or lifted-ElGamal encryption) as an input and outputting an inference result. The neural network model 22 includes one or more processing layers (layers). In the embodiment, the neural network model 22 is configured to execute processes corresponding to the neural network model 12 of the learning device 10 on the encrypted data, and for example, each processing unit 13 of the neural network 12 corresponds to each processing unit 23 of the neural network 22. In the example of FIG. 3, the neural network model 22 includes layers 1 to N. A process (partial process) in each layer is executed by each processing unit 23. The neural network model 22 may be, for example, a model of executing the inference processing for inferring what image data to be processed represents (for example, which of a person, a dog, a cat, and the like is included) and outputting the inference result. The number of layers in the neural network model 22 and the type and content of the partial process to be executed in each layer can be arbitrarily set.

As the processing unit 23 constituting the layer of the neural network model 22, there are the convolution processing unit for performing the convolution process on input image data by using each of the plurality of pieces of filter data (an example of the setting values), the activation function unit for executing the process for converting input data by the activation function, the pooling processing unit for executing the process for down-sampling the input data, the affine processing unit for executing the affine conversion process on the input data, and the SoftMax processing unit for executing the process by the SoftMax function on the input data.

The inference control unit 24 sets the neural network model 22 based on the setting value information 27 stored in the storage unit 25, that is, sets coefficients and the like of the processing unit 23 of the processing layer. In the embodiment, for example, the denominator in a case where the setting value of the multiplier for the processing unit 23 is in a form of a temporary fraction in which the numerator and the denominator are integers is set as a component (first multiplier component) that is not to be used as a target (calculation execution target) to be used in the calculation for the encrypted data and the numerator (integer) is set as a component (second multiplier component) that is to be used as the calculation execution target. Therefore, in the embodiment, for example, the inference control unit 24 sets the processing unit 23 to calculate the non-reflection value (first calculation result) by multiplying a non-reflection value (initial value of a non-reflection value (for example, 1) in a case where there is no input from the preceding stage), which is plaintext data from the preceding stage, by the denominator in a case where the setting value of the multiplier is in a form of a temporary fraction. The inference control unit 24 sets a process using the value corresponding to the numerator of the temporary fraction to the processing unit 23 so that the calculation in the ciphertext space in the processing unit 23 corresponds to the multiplication of the numerator of the temporary fraction in the plaintext space. The processing unit 23 (multiplication corresponding processing unit) set in this manner calculates the non-reflection value (first calculation result) by multiplying the non-reflection value from the preceding stage by the denominator. The processing unit 23 calculates the second calculation result by executing calculation in the ciphertext space corresponding to the multiplication calculation of multiplying the input encrypted data by the numerator (integer) for the plaintext data as the multiplier. The processing unit 23 outputs the non-reflection value (first calculation result) in association with the second calculation result to the subsequent stage.

Herein, the homomorphic encryption used in the embodiment will be described. In the present example, Paillier encryption, which is an additive homomorphic encryption, will be described as an example.

When processes related to the encryption are performed, various settings as follows are determined in advance. That is, secure prime numbers p and q used in the encryption are prepared. In addition, procedures and cautions in determining the prime numbers may be the same as the RSA encryption. In addition, it is assumed that N=p×q. In addition, k is arbitrarily set within the range of $0 \leq k \leq N-1$. It is assumed that g=1+kN. Herein, p and q are secret keys, and g and N are public keys and also system parameters.

For example, if the plaintext data are A and B ($0 \leq A \leq N-1$, $0 \leq B \leq N-1$), the encrypted data $e_A$ and $e_B$ obtained by encrypting the plaintext data are expressed by the following Equations (1) and (2).

$$e_A = g^A \times r_1^N \mod N^2 \quad (1)$$

$$e_B = g^B \times r_2^N \mod N^2 \quad (2)$$

Herein, $r_1$ ($0 \leq r_1 \leq N-1$) and $r_2$ ($0 \leq r_2 \leq N-1$) are random numbers.

Regarding the encrypted data of the Paillier encryption, a calculation corresponding to the sum calculation between the plaintext data can be executed as multiplication of the encrypted data.

The multiplication of the encrypted data, that is, $e_A \times e_B$, is as expressed in Equation (3).

$$\begin{aligned} e_A \times e_B &= g^A \times g^B \times r_1^N \times r_2^N \mod N^2 \\ &= g^{A+B} \times r_1^N \times r_2^N \mod N^2 \\ &= e_{A+B} \end{aligned} \quad (3)$$

When $e_{A+B}$ expressed in Equation (3) is decrypted, $e_{A+B}$ becomes A+B. Therefore, it can be understood that the multiplication of the encrypted data corresponds to the sum calculation of the plaintext data.

In addition, regarding the encrypted data of the Paillier encryption, a calculation corresponding to the multiplication of the plaintext data by the integer of the plaintext data can be executed.

A×C, which is the multiplication of the plaintext data A and integer C, corresponds to the sum calculation of adding A up C times. Therefore, by performing the multiplication of the encrypted data for each of the sum calculations, it is possible to execute the calculation corresponding to the multiplication of the plaintext data A and the integer C by the encrypted data.

More specifically, $e_A \times e_A \times \ldots$, that is, cumulative multiplication (multiplication the integer C times) of the encrypted data may be performed as expressed in Equation (4).

$$e_A \times e_A \times \ldots = e_{A+A+\ldots} = e_{AC} \quad (4)$$

When $e_{AC}$ illustrated in Equation (4) is decrypted, $e_{AC}$ becomes AC, which is a result of the multiplication of the plaintext data A and the integer C. Therefore, it can be understood that the calculation of cumulatively multiplying the same encrypted data of the Paillier encryption is the calculation corresponding to the multiplication of the plaintext data and the integer of the plaintext data.

In addition, the inference control unit 24 inputs target data 26, which is data to be processed, to the neural network model 22 and causes the neural network model 22 to execute the inference processing. In the embodiment, the target data 26 is encrypted data encrypted based on homomorphic encryption.

The storage unit 25 stores the target data 26 to be subjected to the inference processing in the neural network model 22 of the inference unit 21 and the setting value information 27 which is information on the setting values such as the coefficients and the like of the neural network model 22. As the setting values included in the setting value information 27, there are, for example, the coefficients, weights, and the like of the filter used as the multiplier in the processing unit 23.

The reception unit 28 receives the setting value information transmitted from the learning device 10 and stores the setting value information in the storage unit 25. In addition, the reception unit 28 receives the encrypted target data 26 transmitted from the client device 30 and stores the encrypted target data 26 in the storage unit 25.

The inference result transmission unit 29 transmits the result of the inference process in the neural network model 22 of the inference unit 21, that is, the first inference result and the second inference result (inference result (intermediate)) outputted from the processing unit 23 of the last stage, to the client device 30.

Next, the client device 30 will be described in detail.

Figure 4:
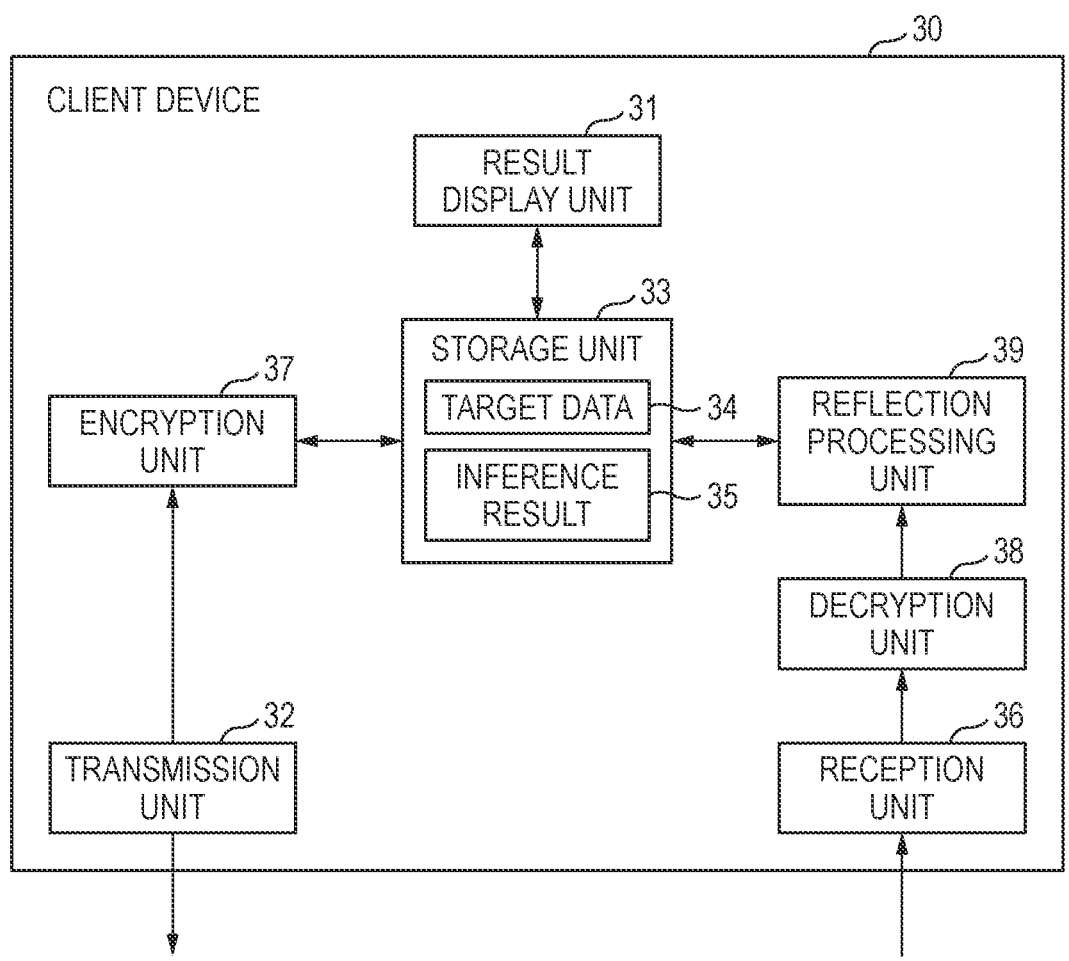
FIG. 4 is a functional configuration diagram illustrating a client device according to the embodiment.

FIG. 4 is a functional configuration diagram of the client device according to the embodiment.

The client device 30 includes a result display unit 31, a transmission unit 32, a storage unit 33, a reception unit 36 as an example of a processing result reception unit, an encryption unit 37, a decryption unit 38, and a reflection processing unit 39.

The storage unit 33 stores the target data 34 which is plaintext data for executing the inference process and the inference result 35 of the inference process. The inference result 35 is stored if the inference result is transmitted from the inference device 20 and a predetermined process is performed, and the inference result 35 does not exist in the inference result regarding the target data 34 on which the inference process by the inference device 20 is not performed.

The encryption unit 37 encrypts the unencrypted target data 34 stored in the storage unit 33 by homomorphic encryption (for example, Paillier encryption) to obtain encrypted data and transfers the encrypted data to the transmission unit 32.

The transmission unit 32 transmits the encrypted data transferred from the encryption unit 37 to the inference device 20 as the target data of the inference process. The reception unit 36 receives the inference result (intermediate) from the inference device 20 and transfers the inference result to the decryption unit 38.

The decryption unit 38 receives the inference result (intermediate) transferred from the reception unit 36, performs decryption corresponding to the encryption method of the encryption unit 37 on the second inference result included in the inference result (intermediate), and transfers the decrypted second inference result and the first inference result to the reflection processing unit 39.

The reflection processing unit 39 generates the final inference result (inference result (final)) by executing the reflection process for reflecting the first inference result on the decrypted second inference result and stores the generated inference result (final) in the storage unit 33. In the embodiment, the reflection processing unit 39 generates the inference result (final) by dividing the decrypted second inference result by the first inference result.

The result display unit 31 displays and outputs various types of information based on the inference result 35 (inference result (final)) stored in the storage unit 33. The result display unit 31 may display the inference result 35 as it is or may execute a predetermined process based on the inference result 35 and display the execution result.

Next, a more specific example of the processing system 1 will be described.

Figure 5:
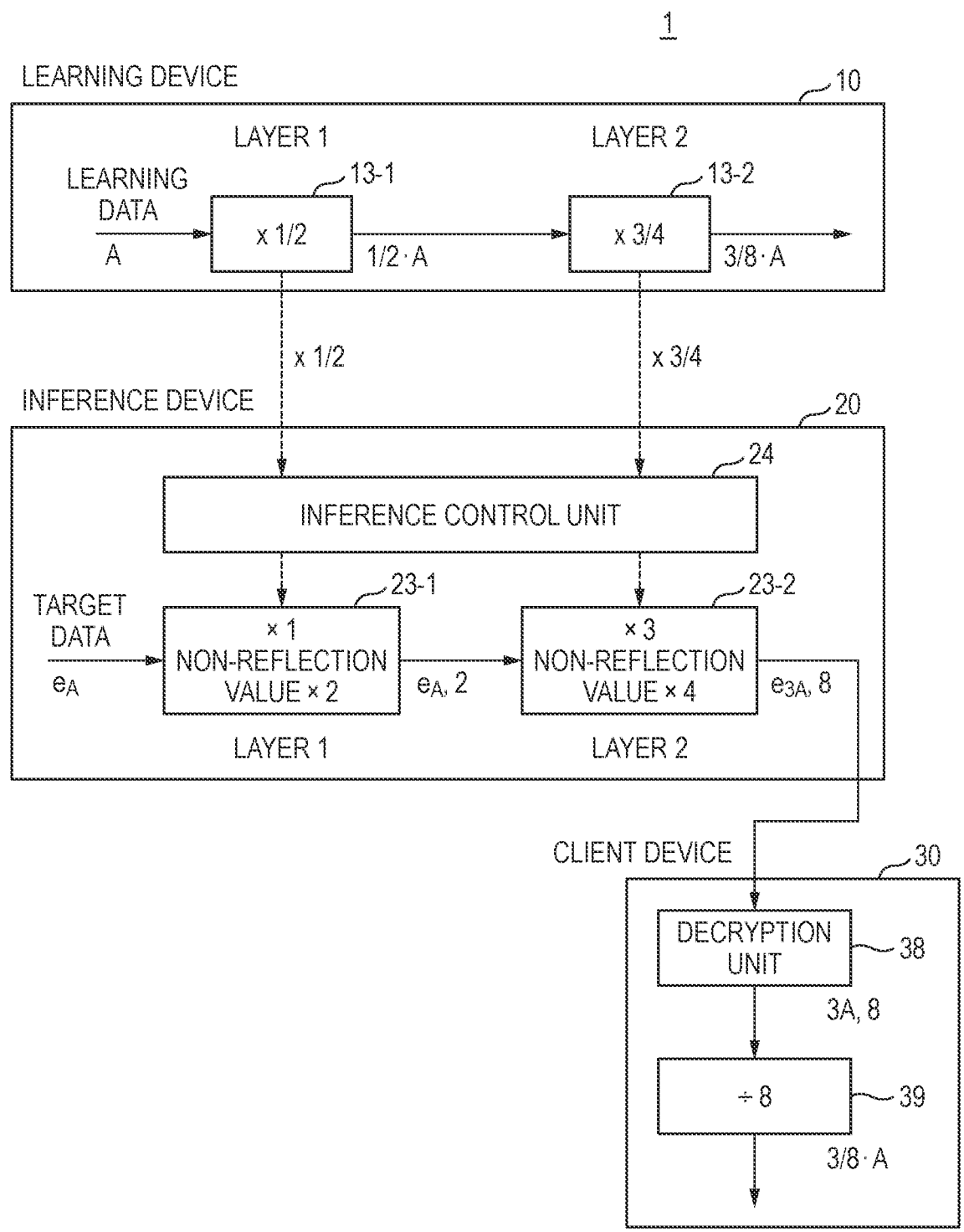
FIG. 5 is a functional configuration diagram illustrating an example of the processing system according to the embodiment.

FIG. 5 is a functional configuration diagram of an example of the processing system according to the embodiment.

The learning device 10 includes a processing unit 13-1 of a processing layer 1 and a processing unit 13-2 of a processing layer 2.

The processing unit 13-1 performs a multiplication process of multiplying the input data by ½. ½ is obtained as a setting value used for calculation in the processing unit 13-1 by learning of the learning device 10. For example, when the plaintext data A is input to the processing unit 13-1, the processing unit 13-1 calculates A×(½), and then, ½·A is output. The learned setting value (½ in the present example) for the processing unit 13-1 is transmitted to the inference device 20 by the setting value notification unit 18.

The processing unit 13-2 performs a multiplication process of multiplying the input data by ¾ and outputs the multiplication result. ¾ is obtained as a setting value used for calculation in the processing unit 13-2 by learning of the learning device 10. For example, when the plaintext data ½·A output from the processing unit 13-1 is input to the processing unit 13-2, the processing unit 13-2 calculates ½·A×¾, and then, ⅜·A is output. The learned setting value (¾ in the present example) for the processing unit 13-2 is transmitted to the inference device 20 by the setting value notification unit 18.

The inference device 20 includes a processing unit 23-1 of a processing layer 1, a processing unit 23-2 of a processing layer 2, and the inference control unit 24.

Regarding each setting value transmitted from the learning device 10, the inference control unit 24 sets the processing units 23-1 and 23-2 so as to calculate the non-reflection value by multiplying the non-reflection value (the initial value (for example, 1) of the non-reflection value in a case where there is no input from the preceding stage), which is the plaintext data from the preceding stage, by the denominator in a case where the setting value of the multiplier is in a form of a temporary fraction. The inference control unit 24 sets a process using the value corresponding to the numerator of the temporary fraction to the processing units 23-1 and 23-2 so that the calculation in the ciphertext space in the processing unit 23 corresponds to the multiplication of the numerator of the temporary fraction in the plaintext space.

In the present example, the setting value for the processing unit 23-1 is ½, and the setting value for the processing unit 13-2 is ¾. In the present example, the inference control unit 24 sets the multiplier (first multiplier component) for the non-reflection value to 2 and sets the multiplier (second multiplier component) used for calculation of the encrypted data to 1 regarding the processing unit 23-1. The inference control unit 24 sets the multiplier for the non-reflection value to 4 and sets the multiplier to be used for calculation of the encrypted data to 3 regarding the processing unit 23-2.

The processing unit 23-1 performs a calculation (corresponding calculation) in the ciphertext space corresponding to the process of multiplying the plaintext data by the multiplier (1 in the drawing), which is used for the calculation of the encrypted data, to the input encrypted data. For example, in a case where the Paillier encryption is used, the processing unit 23-1 calculates the second inference result by performing a calculation of cumulatively multiplying the input encrypted data by the multiplier for the plaintext data as a corresponding calculation. The processing unit 23-1 calculates the first inference result by multiplying the initial value (for example, 1) of the non-reflection value by the multiplier (first multiplier component). The processing unit 23-1 outputs the first inference result and the second inference result to the subsequent stage. In the present example, the processing unit 23-1 calculates $e_A$ by cumulatively multiplying the input encrypted data $e_A$ ($e_A$ indicates the value obtained by encrypting the plaintext data A) by the set multiplier (once in the present example). The processing unit 23-1 calculates 2 as the first inference result by multiplying the initial value (for example, 1) of the non-reflection value by the multiplier (2 in the present example). Then, the processing unit 23-1 outputs the first inference result and the second inference result ($e_A$, 2). When $e_A$ is decrypted, $e_A$ becomes the plaintext data A. The plaintext data is divided by 2 which is the second inference result, so that the same result as ½·A which is the output result of the processing unit 13-1 is obtained.

The processing unit 23-2 performs, on the input encrypted data, a calculation (corresponding calculation) in the ciphertext space corresponding to the process of multiplying the multiplier (3 in the drawing) for the plaintext data, which is used for calculation of the encrypted data. For example, in a case where the Paillier encryption is used, the processing unit 23-2 calculates the second inference result by performing a calculation of cumulatively multiplying the input encrypted data by the multiplier for the plaintext data as a corresponding calculation. The processing unit 23-1 calculates the first inference result by multiplying the non-reflection value (second inference result) input from the preceding stage by the multiplier (first multiplier component). The processing unit 23-2 outputs the first inference result and the second inference result to the subsequent stage. In the present example, the processing unit 23-2 calculates $e_{3A}$ by cumulatively multiplying the input encrypted data $e_A$ by the set multiplier (three times in the present example). The processing unit 23-2 calculates 8 as the first inference result by multiplying the input non-reflection value (2 in the present example) by the multiplier (4 in the present example). Then, the processing unit 23-2 outputs the first inference result and the second inference result ($e_{3A}$, 8). When $e_{3A}$ is decrypted, $e_{3A}$ becomes the plaintext data 3A. The plaintext data 3A is divided by the first inference result 8, so that the same result as ⅜·A which is the output result of the processing unit 13-2 is obtained. The processing result (inference result (intermediate)) of the processing unit 23-2 is transmitted to the client device 30 by the inference result transmission unit 29.

In the client device 30, the decryption unit 38 acquires the inference result (intermediate) transmitted from the inference device 20, performs decryption corresponding to the encryption method of the encrypted data on the second inference result included in the inference result (intermediate), obtains the second inference result of the plaintext data, and transfers the second inference result of the plaintext data together with the first inference result to the reflection processing unit 39. For example, in the present example, the decryption unit 38 decrypts $e_{3A}$ to obtain 3A, and transfer (3A, 8) to the reflection processing unit 39.

The reflection processing unit 39 generates an inference result (⅜·A in the present example) reflecting the first inference result by dividing the second inference result (3A in the present example) of the plaintext data received from the decryption unit 38 by the first inference result (8 in the present example). As a result, the client device 30 can obtain the same value as the execution result of executing the processes of the processing units 13-1 and 13-2 of the learning device 10 on the plaintext data.

As described above, in the processing system 1, in the inference device 20, it is possible to perform the processes while maintaining a secret state by using the encrypted data, and in the client device 30, it is possible to obtain the same result as the result obtained by performing the processes on the plaintext data.

Next, the processing operations in the processing system 1 according to the embodiment will be described.

Figure 6:
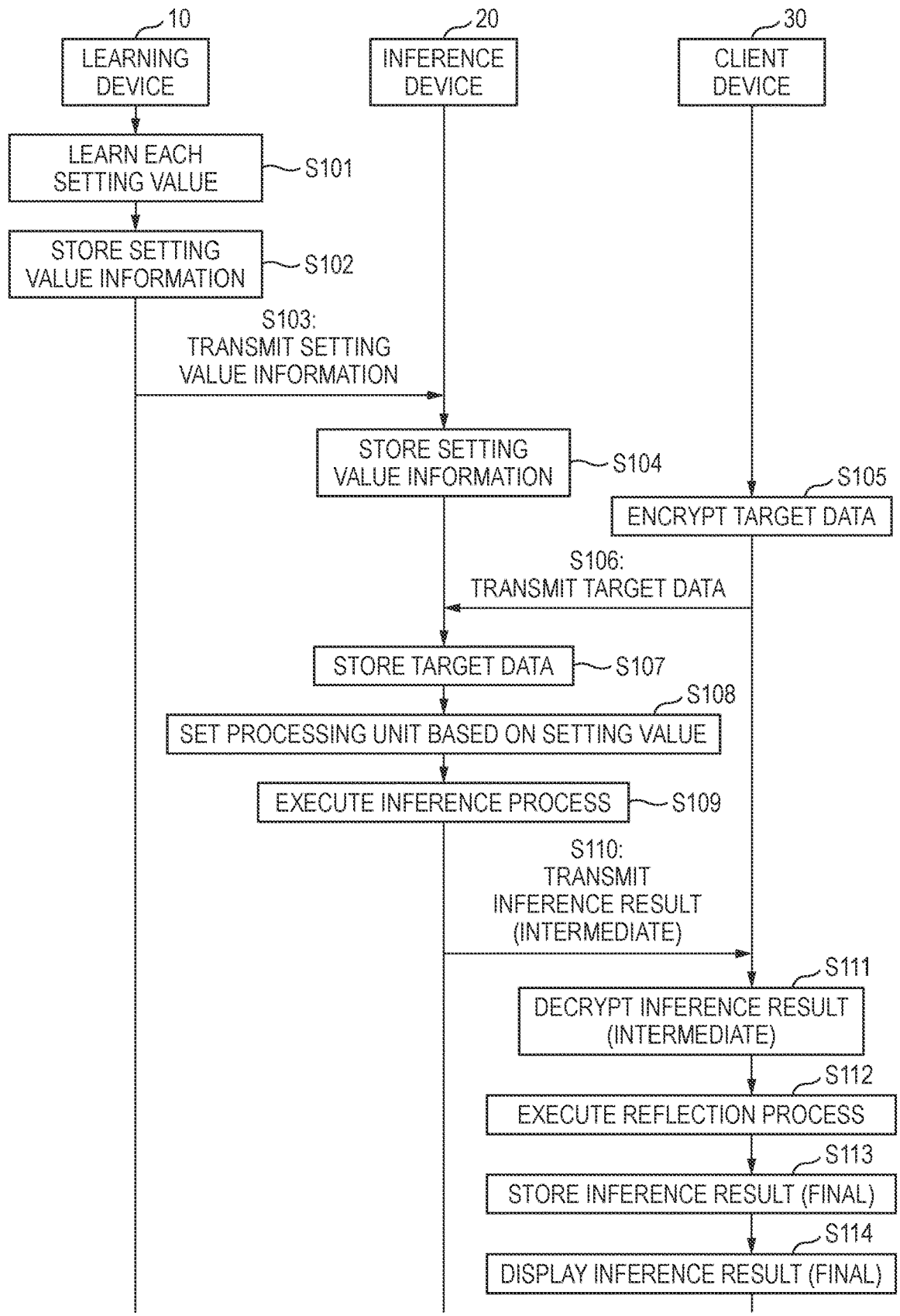
FIG. 6 is a sequence diagram illustrating operations illustrating the processing system according to the embodiment.

FIG. 6 is a sequence diagram illustrating operations of the processing system according to the embodiment.

The learning control unit 14 of the learning device 10 causes the neural network model 12 of the learning unit 11 to execute the inference processing by using the learning data 16 stored in the storage unit 15, so that the learning of various setting values of the processing unit 13 of the neural network model 12 is performed (S101). Next, the learning control unit 14 stores the setting value information on the setting value obtained by learning in the storage unit 15 (S102).

Next, the setting value notification unit 18 reads out the setting value information 17 stored in the storage unit 15 and transmits the setting value information 17 to the inference device 20 (S103).

The reception unit 28 of the inference device 20 receives the setting value information 17 transmitted from the learning device 10 and stores the setting value information 17 in the storage unit 25 (S104). On the other hand, the encryption unit 37 of the client device 30 acquires the target data 34 from the storage unit 33, encrypts the target data 34 with predetermined encryption (S105), and the transmission unit 32 transmits the encrypted target data to the inference device 20 (S106).

The reception unit 28 of the inference device 20 receives the target data to be inferred from the client device 30 and stores the target data in the storage unit 25 (S107). In addition, any one of timing of receiving the setting value information 17 and timing of receiving the target data may be ahead of the other, and the important point is that both are completed before the inference processing is executed.

The inference control unit 24 of the inference device 20 acquires the setting value information 27 from the storage unit 25 and sets each processing unit 23 based on the setting value information 27 (S108). Then, the inference control unit 24 reads out the target data 26 which is the encrypted data from the storage unit 25 and inputs the target data to the processing unit 23 of the first processing layer (layer 1) of the neural network model 22. As a result, in the neural network model 22, the inference process is performed on the target data 26, so that the inference result (intermediate) is output from the processing unit 23 of the final processing layer (layer N) to the inference result transmission unit 29 (S109).

Then, the inference result transmission unit 29 of the inference device 20 transmits the inference result (intermediate) transferred from the neural network model 22 to the client device 30 that requested the inference process of the target data (S110).

The reception unit 36 of the client device 30 receives the inference result (intermediate) from the inference device 20 and transfers the inference result (intermediate) to the decryption unit 38, and the decryption unit 38 decrypts the second inference result included in the inference result (intermediate) and transfers the second inference result together with the first inference result, to the reflection processing unit 39 (S111). The reflection processing unit 39 generates a final inference result (inference result (final)) by executing a process of reflecting the first inference result on the decrypted second inference result (S112) and stores the generated inference result (final) 35 in the storage unit 33 (S113). After that, the result display unit 31 displays and outputs the inference result based on the inference result 35 stored in the storage unit 33 (S114).

As described above, according to the processing system according to the embodiment, in the case of performing a multiplication process on the plaintext data, the inference device 20 performs the multiplication process as a multiplication process on the plaintext data or a multiplication process on the plaintext data and a calculation process on the encrypted data. For this reason, even in a process including a multiplication process of multiplying the plaintext by a number other than an integer, the inference device 20 can perform the process while maintaining the concealed state by the encrypted data. Therefore, it is possible to appropriately prevent the information from leaking out from the inference device 20.

Each of the learning device 10, the inference device 20, and the client device 30 described above can be configured by a computer device.

Figure 7:
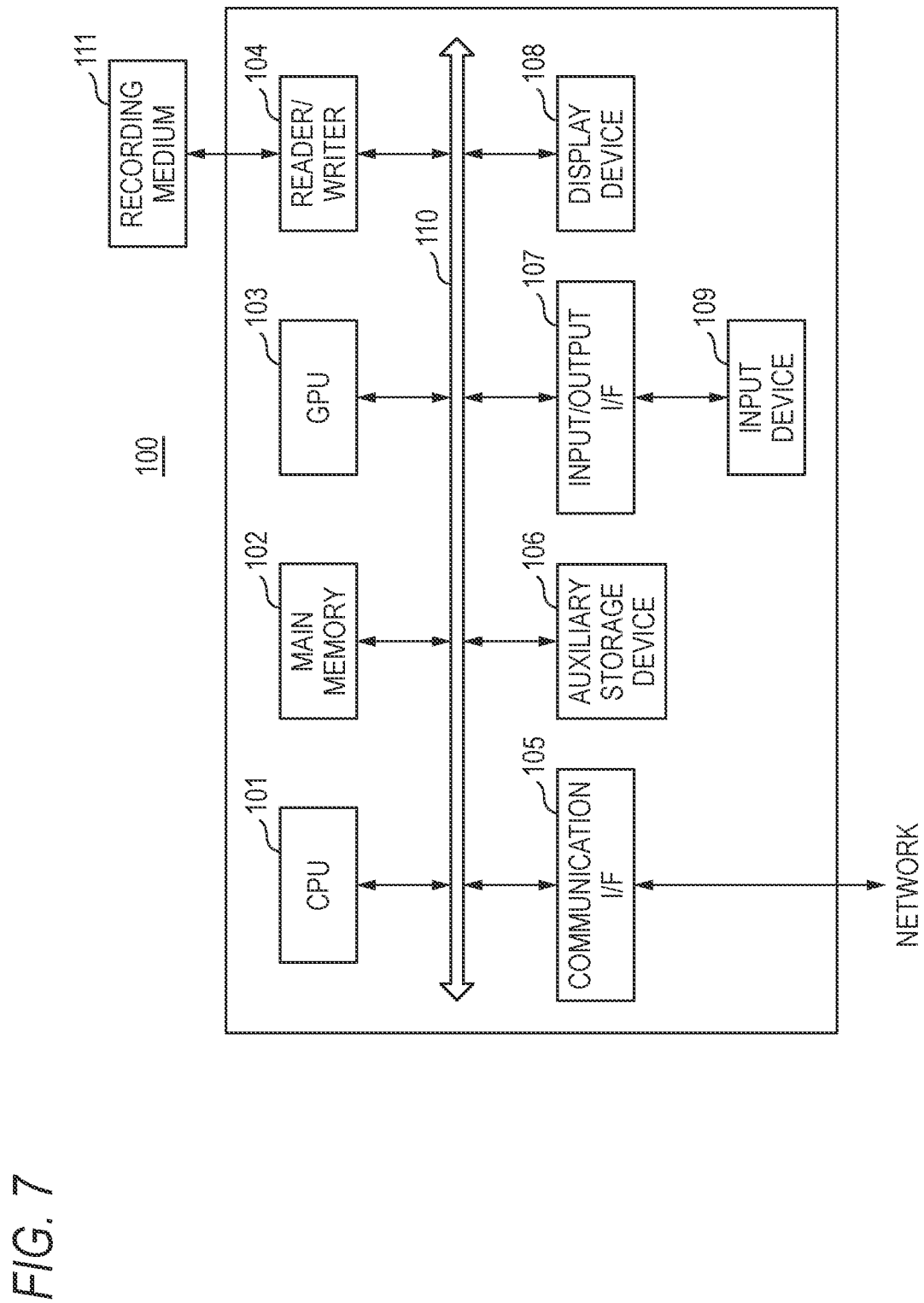
FIG. 7 is a configuration diagram illustrating a computer device according to the embodiment.

FIG. 7 is a configuration diagram illustrating an embodiment of the computer device. In addition, in the embodiment, the learning device 10, the inference device 20, and the client device 30 are configured as separate computer devices, and these computer devices may have the same configuration. In the following description, for the convenience, the computer device constituting each of the learning device 10, the inference device 20, and the client device 30 will be described by using the computer device illustrated in FIG. 7.

The computer device 100 includes, for example, a central processing unit (CPU) 101, a main memory 102, a graphics processing unit (GPU) 103, a reader/writer 104, a communication interface (communication I/F) 105, an auxiliary storage device 106, an input/output interface (input/output I/F) 107, a display device 108, and an input device 109. The CPU 101, the main memory 102, the GPU 103, the reader/writer 104, the communication I/F 105, the auxiliary storage device 106, the input/output I/F 107, and the display device 108 are connected via a bus 110. Each of the learning device 10, the inference device 20, and the client device 30 is configured by appropriately selecting some or all of the components described in the computer device 100.

Herein, at least one of the main memory 102 and the auxiliary storage device 106 functions as the storage unit 15 of the learning device 10, the storage unit 25 of the inference device 20, and the storage unit 33 of the client device 30.

The CPU 101 of the computer device 100 of the learning device 10 totally controls the entire learning device 10. The CPU 101 executes various processes by reading out the program stored in the auxiliary storage device 106 to the main memory 102 and executing the program. In the learning device 10, the CPU 101 executes the processing program stored in the auxiliary storage device 106 to constitute, for example, the neural network model 12 of the learning unit 11. In the computer device 100 of the inference device 20, the CPU 101 executes the processing program stored in the auxiliary storage device 106 to constitute, for example, the neural network model 22 of the inference unit 21. In the computer device 100 of the client device 30, the CPU 101 executes the processing program stored in the auxiliary storage device 106 to constitute, for example, the result display unit 31, the encryption unit 37, the decryption unit 38, and the reflection processing unit 39. The CPU 101 of the computer device 100 of the inference device 20 may have better processing performance than the CPU 101 of the computer device 100 of the client device 30.

The main memory 102 is, for example, a RAM, a ROM or the like and stores programs (processing programs and the like) to be executed by the CPU 101 and various types of information. The auxiliary storage device 106 is, for example, a non-transitory storage device (nonvolatile storage device) such as a hard disk drive (HDD), a solid state drive (SSD) and stores the programs to be executed by the CPU 101 and various types of information. In the computer device 100 of the learning device 10, the main memory 102 stores, for example, the learning data 16 and the setting value information 17. In the computer device 100 of the inference device 20, the main memory 102 stores, for example, the target data 26 and the setting value information 27. In the computer device 100 of the client device 30, the main memory 102 stores, for example, the target data 34 and the inference result 35.

The GPU 103 is, for example, a processor suitable for executing a specific process such as image process and is suitable for executing, for example, a process performed in parallel. In the embodiment, the GPU 103 executes a predetermined process according to an instruction of the CPU 101. In the computer device 100 of the learning device 10, the GPU 103 may constitute at least one processing unit 13. In the computer device 100 of the inference device 20, the GPU 103 may constitute at least one processing unit 23.

The reader/writer 104 is capable of attaching and detaching the recording medium 111, and reads out data from the recording medium 111 and writes data in the recording medium 111. As the recording medium 111, there are exemplified non-transitory recording media (nonvolatile recording media) such as an SD memory card, a floppy disk (FD: registered trademark), a CD, a DVD, a BD (registered trademark), and a flash memory. In the embodiment, a processing program may be stored in the recording medium 111, and the processing program may be read out by the reader/writer 104 to be used. In the computer device 100 of the learning device 10, the learning data may be stored in the recording medium 111, and the learning data may be read out by the reader/writer 104 to be used. In the computer device 100 of the client device 30, the target data may be stored in the recording medium 111, and the target data may be read out by the reader/writer 104 to be stored in the storage unit 33.

The communication I/F 105 is connected to the networks 40 and 50 and performs data transmission and reception regarding other devices connected to the networks 40 and 50. For example, the learning device 10 transmits the setting value information to the inference device 20 connected to the network 40 via the communication I/F 105. Each of the setting value notification unit 18 of the learning device 10, the reception unit 28 and the inference result transmission unit 29 of the inference device 20, and the transmission unit 32 and the reception unit 36 of the client device 30 is configured by the communication I/F 105 and the CPU 101 of the computer device 100 of each unit.

For example, the input/output I/F 107 is connected to the input device 109 such as a mouse, a keyboard, or the like. In the computer device 100 of the learning device 10, the input/output I/F 107 receives an operation input by an administrator of the learning device 10 by using the input device 109. In the computer device 100 of the inference device 20, the input/output I/F 107 receives an operation input by an administrator of the inference device 20 by using the input device 109. In the computer device 100 of the client device 30, the input/output I/F 107 receives an operation input by a user of the client device 30 by using the input device 109.

The display device 108 is, for example, a display device such as a liquid crystal display and displays and outputs various types of information.

Next, a processing system according to a first modified example will be described.

Figure 8:
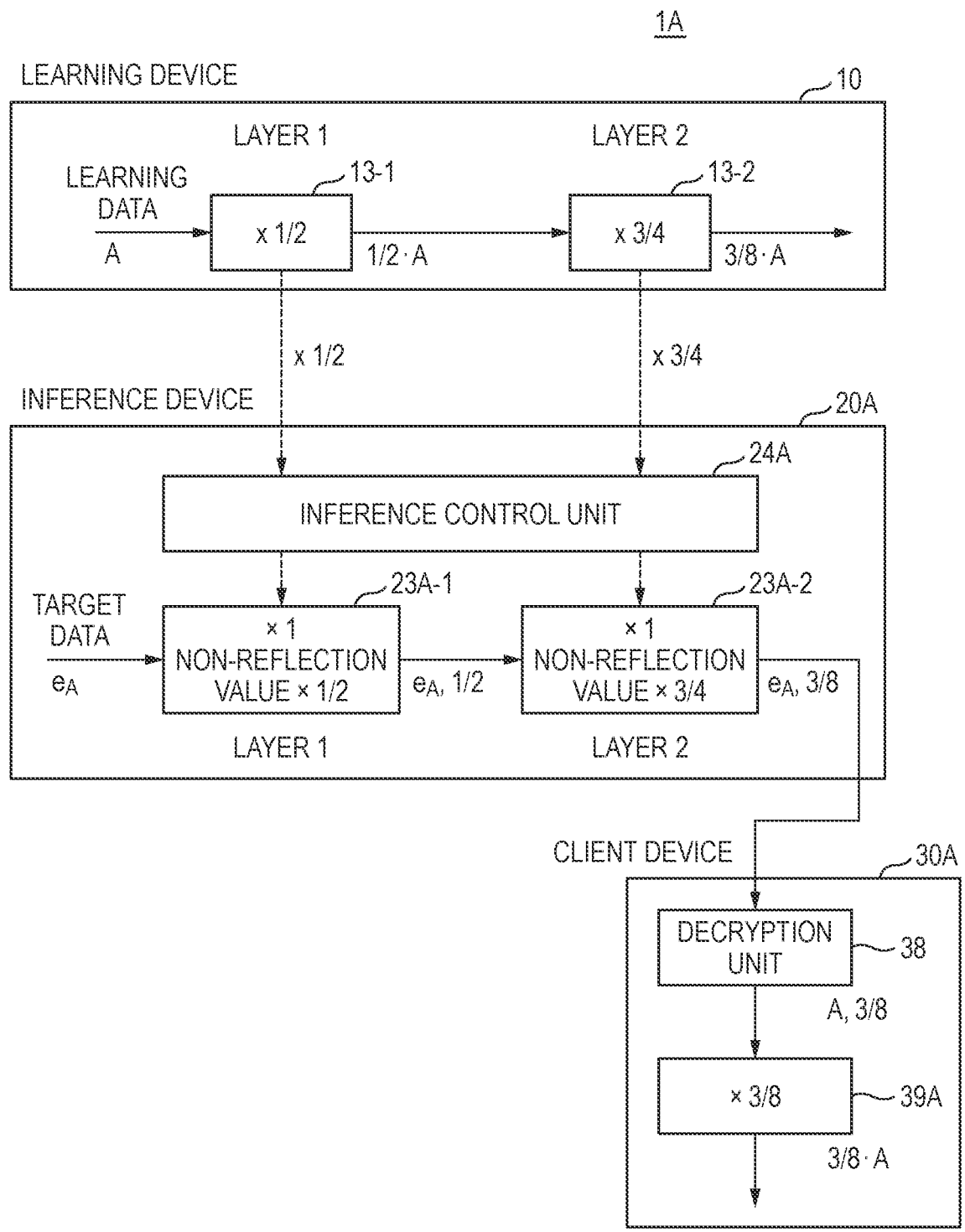
FIG. 8 is a functional configuration diagram illustrating a processing system according to a first modified example.

FIG. 8 is a functional configuration diagram of the processing system according to the first modified example.

A processing system 1A according to the first modified example includes an inference device 20A instead of the inference device 20 and a client device 30A instead of the client device 30 in the processing system 1 illustrated in FIG. 5 described above. The same components as those of the above-described embodiment are denoted by the same reference numerals, and redundant description is omitted.

The inference device 20A includes an inference control unit 24A instead of the inference control unit 24. The inference control unit 24A sets the entire setting values of the multiplier as a component (first multiplier component) that is not to be used as a target (calculation execution target) in the calculation for the encrypted data. As a result, the second multiplication component does not exist. Therefore, in the embodiment, the inference control unit 24A sets the processing units 23A-1 and 23A-2 so as to calculate the non-reflection value (first calculation result) by multiplying a non-reflection value (initial value of a non-reflection value (for example, 1) in a case where there is no input), which is plaintext data from the preceding stage, by the multiplier. The inference control unit 24A sets a process using values corresponding to 1 on the processing units 23A-1 and 23A-2 so that the calculation in the ciphertext space in the processing unit 23 corresponds to the calculation of multiplying the plaintext data by the value 1 indicating that the multiplication is not performed. The processing units 23A-1 and 23A-2 set in this manner calculate the non-reflection value (first calculation result) by multiplying the non-reflection value from the preceding stage by the multiplier. The processing unit 23 sets the input encrypted data as it is as the second calculation result. The processing unit 23 outputs the non-reflection value (first calculation result) in association with the second calculation result to the subsequent stage.

In the present example, the setting value for the processing unit 23A-1 is ½, and the setting value for the processing unit 23A-2 is ¾. In the present example, the inference control unit 24A sets the multiplier (first multiplier component) for the non-reflection value to ½, and sets the multiplier (second multiplier component) used for calculation of the encrypted data to 1. The inference control unit 24A sets the multiplier for the non-reflection value to ¾ and sets the multiplier to be used for calculation of the encrypted data to 1 regarding the processing unit 23A-2.

In the present example, the processing unit 23A-1 calculates $e_A$ by cumulatively multiplying the input encrypted data $e_A$ by the set multiplier (once in the present example). The processing unit 23A-1 calculates ½ as the first inference result by multiplying the initial value (for example, 1) of the non-reflection value by the multiplier (½ in the present example). Then, the processing unit 23A-1 outputs the first inference result and the second inference result ($e_A$, ½). When $e_A$ is decrypted, $e_A$ becomes the plaintext data A. The plaintext data A is multiplied by ½ which is the first inference result, so that the same result as ½·A which is the output result of the processing unit 13-1 is obtained.

In the present example, the processing unit 23A-2 calculates $e_A$ by cumulatively multiplying the encrypted data $e_A$ which is the input second calculation result by the set multiplier (once in the present example). The processing unit 23A-2 calculates ⅜ as the first inference result by multiplying the input non-reflection value (½ in the present example) by the multiplier (¾ in the present example). Then, the processing unit 23A-2 outputs the first inference result and the second inference result ($e_A$, ⅜). When $e_A$ is decrypted, $e_A$ becomes the plaintext data A. The plaintext data A is multiplied by ⅜ which is the first inference result, so that the same result as ⅜·A which is the output result of the processing unit 13-2 is obtained. The processing result (inference result (intermediate)) of the processing unit 23A-2 is transmitted to the client device 30A by the inference result transmission unit 29.

The reflection processing unit 39 of the client device 30A generates an inference result (⅜·A in the present example) reflecting the first inference result by multiplying the second inference result (A in the present example) of the plaintext data received from the decryption unit 38 by the first inference result (⅜ in the present example). As a result, the client device 30A can obtain the same value as the execution result of executing the processes of the processing units 13-1 and 13-2 of the learning device 10 on the plaintext data.

According to the processing system 1A, since the multiplication is completed by the inference device 20A without cumulative multiplication (multiplying two or more times) of the encrypted data corresponding to the multiplication of the plaintext data, the processing load of the calculation on the encrypted data is reduced.

Next, a processing system according to a second modified example will be described.

Figure 9:
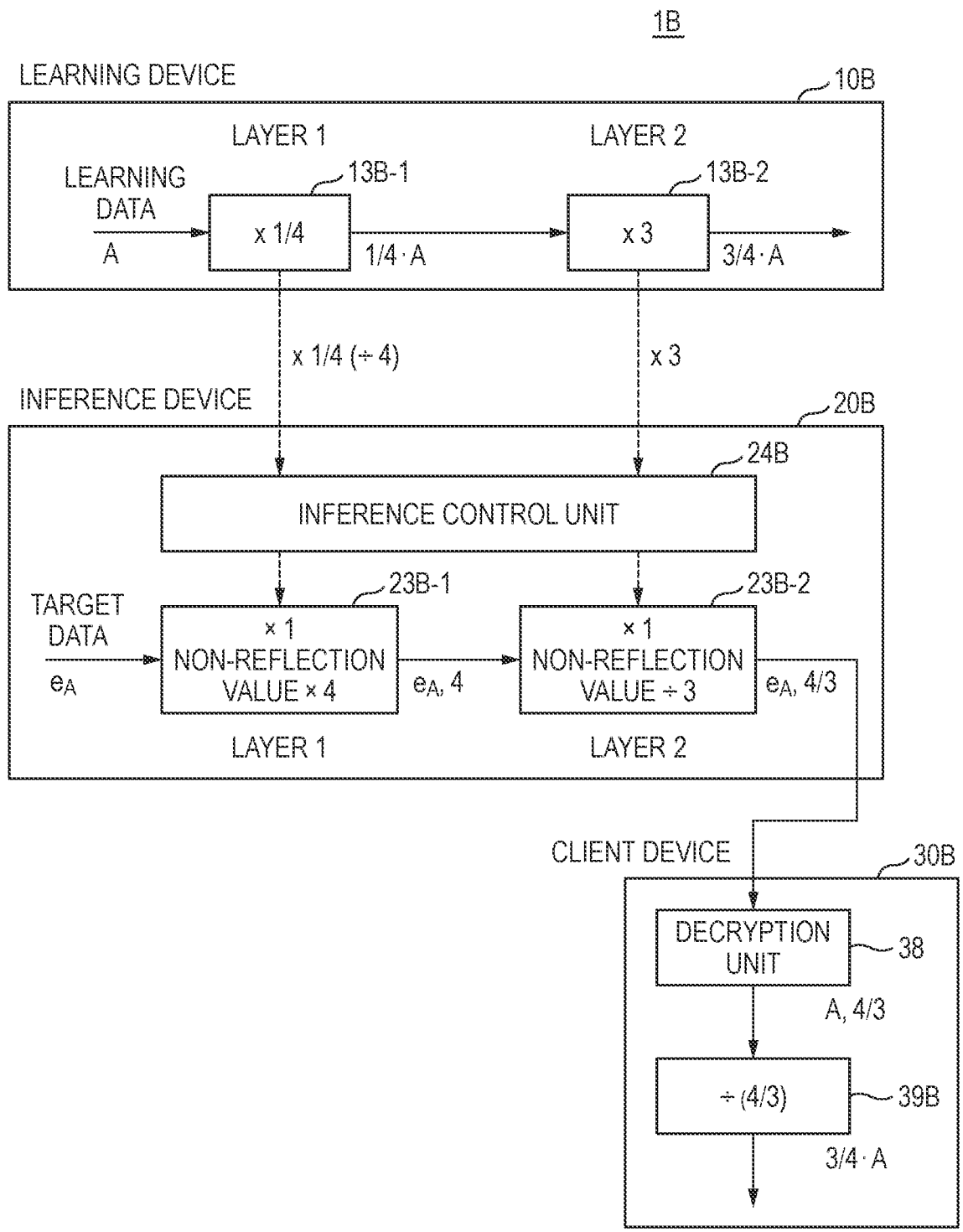
FIG. 9 is a functional configuration diagram illustrating a processing system according to a second modified example.

FIG. 9 is a functional configuration diagram of the processing system according to the second modified example.

The processing system 1B according to the second modified example includes a learning device 10B instead of the learning device 10, an inference device 20B instead of the inference device 20, and a client device 30B instead of the client device 30 in the processing system 1 illustrated in FIG. 5 described above.

The learning device 10B includes a processing unit 13B-1 and a processing unit 13B-2. In the present example, the setting value of the processing unit 13B-1 is ¼, and the setting value of the processing unit 13B-2 is 3.

The inference device 20B includes an inference control unit 24B instead of the inference control unit 24 in the inference device 20. The inference control unit 24B sets the entire setting values of the multiplier as a component (first multiplier component) that is not to be used as a calculation execution target for encrypted data. As a result, the second multiplication component does not exist. In the embodiment, the inference control unit 24B sets processing units 23B-1 and 23B-2 so as to calculate the non-reflection value (first calculation result) by dividing a non-reflection value (initial value of a non-reflection value (for example, 1) in a case where there is no input from the preceding stage), which is plaintext data from the preceding stage, by the setting value of the multiplier. In the embodiment, the non-reflection value is used as a value to be finally divided. The inference control unit 24B sets a process using the value corresponding to 1 on the processing units 23B-1 and 23B-2 so that the calculation in the ciphertext space in the processing unit 23 correspond to the calculation of multiplying the plaintext data by the value 1 indicating that the calculation is not performed. The processing units 23B-1 and 23B-2 set in this manner calculate the non-reflection value (first calculation result) by dividing the non-reflection value from the preceding stage by the setting value. The processing unit 23 sets the input encrypted data as it is as the second calculation result. The processing unit 23 outputs the non-reflection value (first calculation result) in association with the second calculation result to the subsequent stage.

In the present example, the inference control unit 24B sets the multiplier (first multiplier component) for the non-reflection value to 4 and sets the multiplier (second multiplier component) used for calculation of the encrypted data to 1 regarding the processing unit 23B-1. The inference control unit 24B sets the divisor for the non-reflection value to 3 (⅓ in the case of a multiplier) and sets the multiplier to be used for calculation of the encrypted data to 1 regarding the processing unit 23B-2.

In the present example, the processing unit 23B-1 calculates $e_A$ by cumulatively multiplying the input encrypted data $e_A$ by the set multiplier (once in the present example). The processing unit 23B-1 calculates 4 as the first inference result by multiplying the initial value (for example, 1) of the non-reflection value by the multiplier (4 in the present example). Then, the processing unit 23B-1 outputs the first inference result and the second inference result ($e_A$, 4). When $e_A$ is decrypted, $e_A$ becomes the plaintext data A. The plaintext data A is divided by 4 which is the second inference result, so that the same result as ¼·A which is the output result of the processing unit 13B-1 is obtained.

In the present example, the processing unit 23B-2 calculates $e_A$ by cumulatively multiplying the encrypted data $e_A$, which is the input second calculation result, by the set multiplier (once in the present example). The processing unit 23B-2 calculates ⁴⁄₃ as the first inference result by dividing the input non-reflection value (4 in the present example) by the divisor (3 in the present example). Then, the processing unit 23B-2 outputs the first inference result and the second inference result ($e_A$, ⁴⁄₃). When $e_A$ is decrypted, $e_A$ becomes the plaintext data A. The plaintext data A is divided by ⁴⁄₃ which is the first inference result, so that the same result as ¾·A which is the output result of the processing unit 13B-2 is obtained. The processing result (inference result (intermediate)) of the processing unit 23B-2 is transmitted to the client device 30B by the inference result transmission unit 29.

A reflection processing unit 39B of the client device 30B generates an inference result (¾·A in this example) reflecting the first inference result by dividing the second inference result (A in this example) of the plaintext data received from the decryption unit 38 by the first inference result (⁴⁄₃ in this example). As a result, the client device 30B can obtain the same value as the execution result of executing the processes of the processing units 13B-1 and 13B-2 of the learning device 10B on the plaintext data.

According to the processing system 1B, since the multiplication is completed by the inference device 20B without cumulative multiplication (multiplying two or more times) of the encrypted data corresponding to the multiplication of the plaintext data, the processing load of the calculation on the encrypted data is reduced.

Next, a processing system according to a third modified example will be described.

Figure 10:
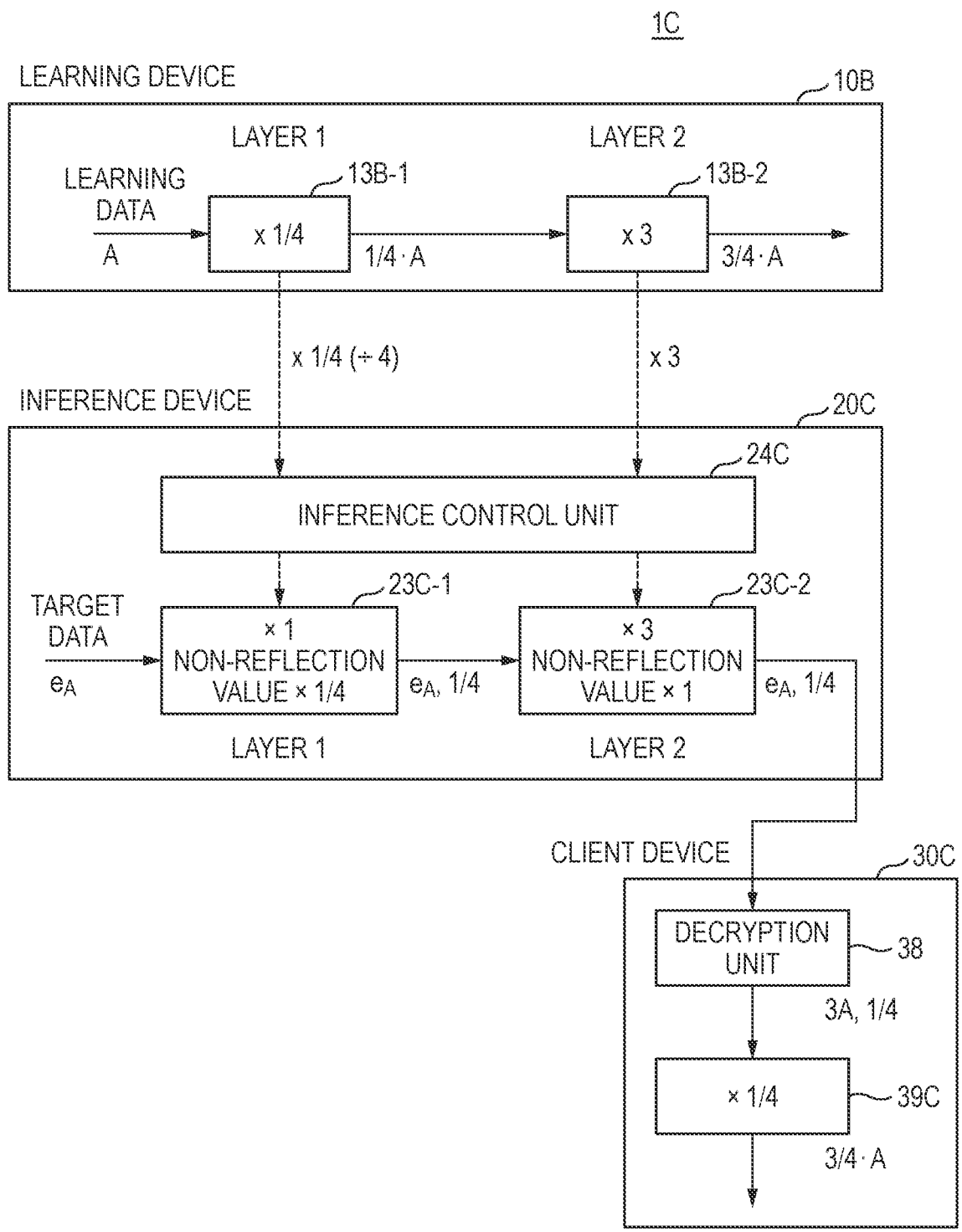
FIG. 10 is a functional configuration diagram illustrating a processing system according to a third modified example.

FIG. 10 is a functional configuration diagram of a processing system according to the third modified example.

The processing system 1C according to the third modified example includes an inference device 20C instead of the inference device 20B and a client device 30C instead of the client device 30B in the processing system 1B illustrated in FIG. 9.

The inference device 20C includes an inference control unit 24C instead of the inference control unit 24B in the inference device 20B. The inference control unit 24C sets the denominator in a case where the setting value of the multiplier is in a form of a temporary fraction as a component (first multiplier component) that is not to be used as a target (calculation execution target) to be used in the calculation for the encrypted data and sets the numerator (integer) as a component (second multiplier component) that is to be used as the calculation execution target. Therefore, in the embodiment, for example, the inference control unit 24C sets processing units 23C-1 and 23C-2 to calculate the non-reflection value (first calculation result) by multiplying the non-reflection value (the initial value (for example, 1) of the non-reflection value in a case where there is no input from the preceding stage), which is the plaintext data from the preceding stage, by one-over-denominator (1/denominator) in a case where the setting value of the multiplier is in a form of a temporary fraction. The inference control unit 24C sets a process using the value corresponding to the numerator of the temporary fraction to the processing units 23C-1 and 23C-2 so that the calculation in the ciphertext space in the processing unit 23 corresponds to the multiplication of the numerator of the temporary fraction in the plaintext space. The processing units 23C-1 and 23C-2 set in this manner calculate the non-reflection value (first calculation result) by multiplying the non-reflection value from the preceding stage by 1/denominator. The processing units 23C-1 and 23C-2 calculate the second calculation result by executing the calculation in the ciphertext space corresponding to the calculation of multiplying the input encrypted data by the numerator (integer) for the plaintext data as a multiplier. The processing unit 23 outputs the non-reflection value (first calculation result) in association with the second calculation result to the subsequent stage.

In the present example, the inference control unit 24C sets the multiplier (first multiplier component) for the non-reflection value to ¼ and sets the multiplier (second multiplier component) to be used for calculation of the encrypted data to 1 regarding the processing unit 23C-1. The inference control unit 24C sets the multiplier for the non-reflection value to 1 and sets the multiplier to be used for calculation of the encrypted data to 3 regarding the processing unit 23C-2.

In the present example, the processing unit 23C-1 calculates $e_A$ by cumulatively multiplying the input encrypted data $e_A$ by a set multiplier (once in the present example). The processing unit 23C-1 calculates ¼ as the first inference result by multiplying the initial value (for example, 1) of the non-reflection value by the multiplier (¼ in the present example). Then, the processing unit 23C-1 outputs the first inference result and the second inference result ($e_A$, ¼). When $e_A$ is decrypted, $e_A$ becomes the plaintext data A. The plaintext data A is multiplied by ¼ which is the first inference result, so that the same result as ¼·A which is the output result of the processing unit 13B-1 is obtained.

In the present example, the processing unit 23C-2 calculates $e_{3A}$ by cumulatively multiplying the encrypted data $e_A$, which is the input second calculation result, by the set multiplier (three times in the present example). The processing unit 23C-2 calculates ¼ as the first inference result by multiplying the input non-reflection value (¼ in the present example) by the multiplier (1 in the present example). Then, the processing unit 23C-2 outputs the first inference result and the second inference result ($e_{3A}$, ¼). When $e_{3A}$ is decrypted, $e_{3A}$ becomes the plaintext data 3A. The plaintext data 3A is multiplied by ¼ which is the first inference result, so that the same result as ¾·A which is the output result of the processing unit 13B-2 is obtained. The processing result (inference result (intermediate)) of the processing unit 23C-2 is transmitted to the client device 30C by the inference result transmission unit 29.

A reflection processor 39C of the client device 30C generates an inference result (¾·A in the present example) reflecting the first inference result by multiplying the second inference result (3A in the present example) of the plaintext data received from the decryption unit 38 by the first inference result (¼ in the present example). As a result, the client device 30C can obtain the same value as the execution result of executing the processes of the processing units 13B-1 and 13B-2 of the learning device 10B on the plaintext data.

Next, a processing system according to a fourth modified example will be described.

Figure 11:
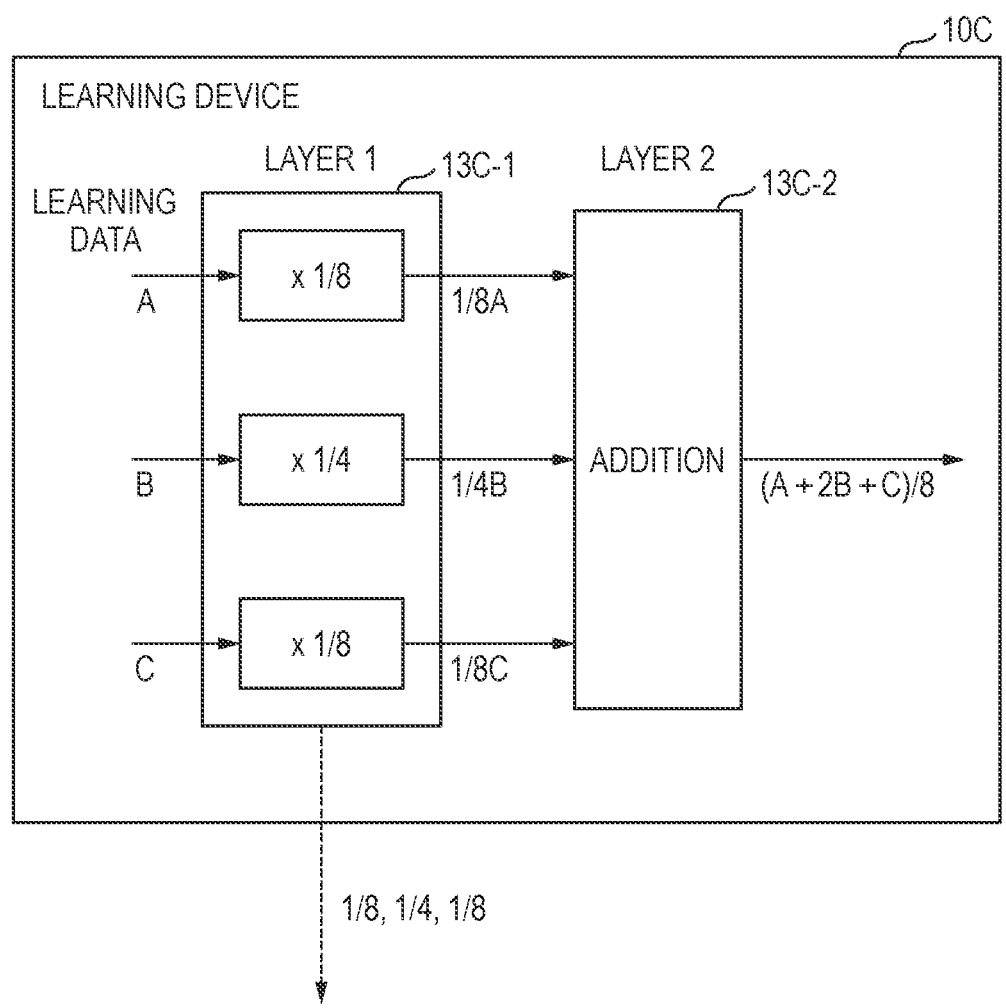
FIG. 11 is a functional configuration diagram illustrating a learning device of a processing system according to a fourth modified example.

FIG. 11 is a functional configuration diagram of a learning device of the processing system according to the fourth modified example.

A learning device 10C of the processing system according to the fourth modified example includes a processing unit 13C-1 of a processing layer 1 and a processing unit 13C-2 of a processing layer 2.

The processing unit 13C-1 performs a multiplication process on each of the three pieces of input data. In the present example, the processing unit 13C-1 performs a multiplication process of multiplying a first data by ⅛, performs a multiplication process of multiplying a second data by ¼, and performs a multiplication process of multiplying a third data by ⅛. The multipliers in the three multiplication processes are obtained as the setting values used for calculation in the processing unit 13C-1 by learning of the learning device 10 C. For example, when the plaintext data A, B, and C are input to the processing unit 13C-1, the processing unit 13C-1 obtains A×(⅛), B×(¼), and C×(⅛), and thus, ⅛·A, ¼·B and ⅛·C are output. The learned setting values (⅛, ¼, and ⅛ in the present example) for the processing unit 13C-1 are transmitted to the inference device 20 by the setting value notification unit 18.

The processing unit 13C-2 performs the process of adding three pieces of data input from the processing unit 13C-1 and outputs the result. For example, when ⅛·A, ¼·B, and ⅛·C which are the plaintext data output from the processing unit 13C-1 are input to the processing unit 13C-2, the processing unit 13C-2 executes the calculation of adding ⅛·A, ¼·B, and ⅛·C and outputs (A+2B+C)/8.

Next, a functional configuration of an inference device and a client device of a processing system according to the fourth modified example will be described.

Figure 12:
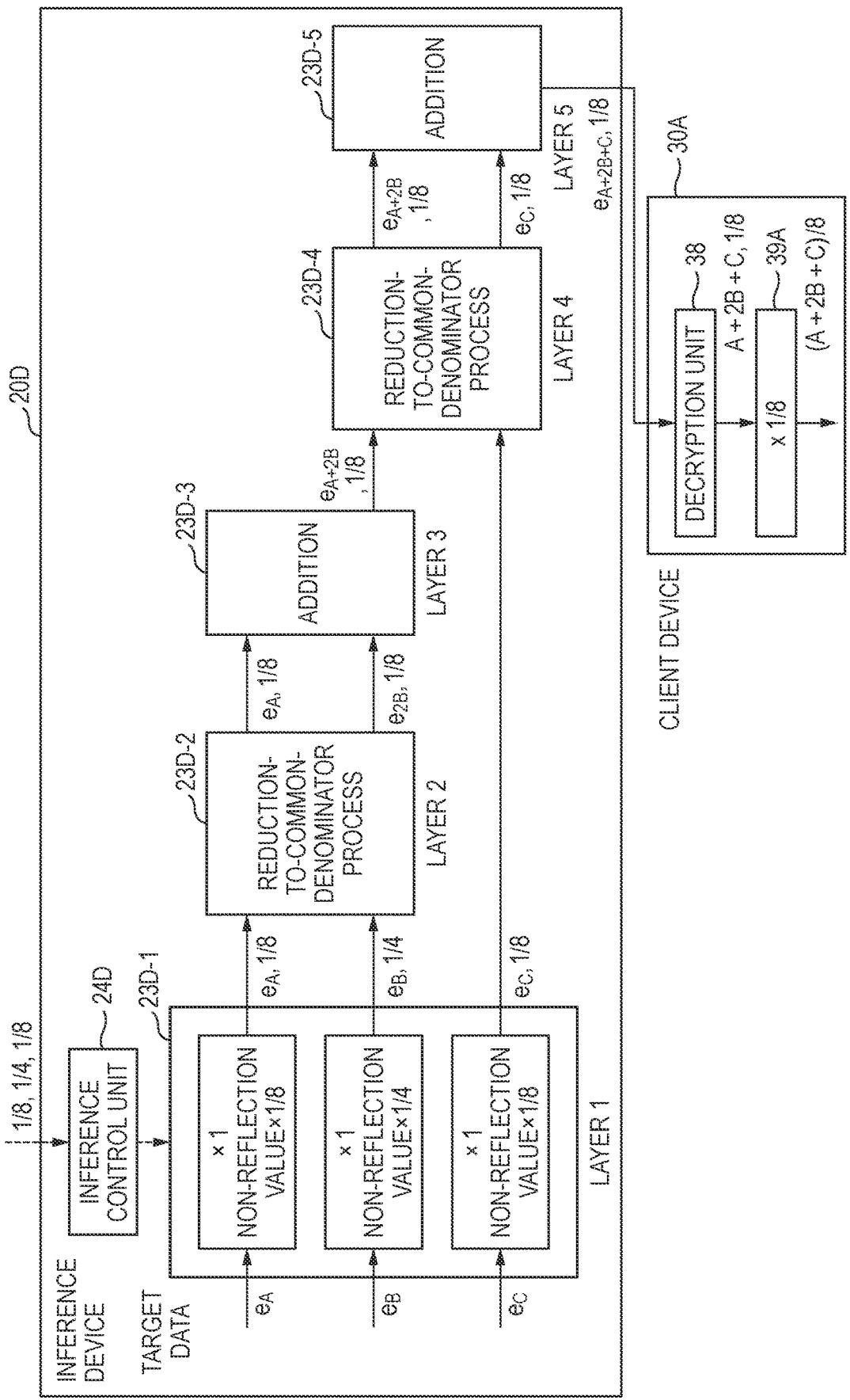
FIG. 12 is a functional configuration diagram illustrating an inference device and a client device of a processing system according to the fourth modified example.

FIG. 12 is a functional configuration diagram of the inference device and the client device of the processing system according to the fourth modified example.

The inference device 20D includes an inference control unit 24D, a processing unit 23D-1 of a processing layer 1, a processing unit 23D-2 of a processing layer 2, a processing unit 23D-3 of a processing layer 3, a processing unit 23D-4 of a processing layer 4, and a processing unit 23D-5 of a processing layer 5. In the present example, the processing layer 1 of the learning device 10C corresponds to the processing layer 1 of the inference device 20D, and the processing layer 2 of the learning device 10C corresponds to the processing layers 2 to 5 of the inference device 20D.

The inference control unit 24D sets the entire setting values of the multipliers as a component (first multiplier component) that is not to be used as a calculation execution target on the encrypted data. As a result, the second multiplication component does not exist. In the embodiment, the inference control unit 24D sets the processing unit 23D-1 so as to calculate the non-reflection value (first calculation result) by multiplying the non-reflection value (the initial value (for example, 1) of the non-reflection value in a case where there is no input from the preceding stage), which is the plaintext data from the preceding stage, by the setting value of the multiplier regarding each pieces of input data to be multiplied in the same processing unit. In the present example, the non-reflection value is used as a value to be finally multiplied. The inference control unit 24D sets a process using the value corresponding to 1 to the processing unit 23D-1 so that the calculation in the ciphertext space in the processing unit 23 corresponds to the calculation of multiplying the plaintext data by the value 1 indicating that multiplication is not performed. The processing unit 23D-1 set in this manner calculates the non-reflection value (first calculation result) by dividing the initial value of the non-reflection value by the setting value regarding each of the input encrypted data. The processing unit 23D-1 sets the input encrypted data as it is as the second calculation result. The processing unit 23D-1 outputs the non-reflection value (first calculation result) in association with the second calculation result for each input to the subsequent stage.

In this example, the inference control unit 24D sets the multiplier (first multiplier component) for the non-reflection value to ⅛ and sets the multiplier (the second multiplier component) to be used for the calculation of the encrypted data to 1 regarding the first input of the processing unit 23D-1; sets the multiplier (first multiplier component) for the non-reflection value to ¼ and sets the multiplier (second multiplier component) to be used for the calculation of the encrypted data to 1 regarding the second input of the processing unit 23D-1; and sets the multiplier (first multiplier component) for the non-reflection value to ⅛ and sets the multiplier (second multiplier component) to be used for the calculation of the encrypted data to 1 regarding the third input of the processing unit 23D-1.

In the present example, the processing unit 23D-1 calculates $e_A$ by cumulatively multiplying the input first encrypted data $e_A$ by the set multiplier (once in the present example) and calculates ⅛ as the first inference result by multiplying the initial value (for example, 1) of the non-reflection value corresponding to the first data by the multiplier (⅛ in the present example). Then, the processing unit 23D-1 outputs the first inference result and the second inference result ($e_A$, ⅛) corresponding to the first encrypted data $e_A$ to the processing unit 23D-2.

The processing unit 23D-1 calculates $e_B$ by cumulatively multiplying the input second encrypted data $e_B$ by the set multiplier (once in the present example) and calculates ¼ as the first inference result by multiplying the initial value (for example, 1) of the non-reflection value corresponding to the second data by the multiplier (¼ in the present example). Then, the processing unit 23D-1 outputs the first inference result and the second inference result ($e_B$, ¼) corresponding to the second encrypted data $e_B$ to the processing unit 23D-2.

The processing unit 23D-1 calculates $e_C$ by cumulatively multiplying the input third encrypted data $e_C$ by the set multiplier (once in the present example) and calculates ⅛ as the first inference result by multiplying the initial value (for example, 1) of the non-reflection value corresponding to the third data by the multiplier (⅛ in the present example). Then, the processing unit 23D-1 outputs the first inference result and the second inference result ($e_C$, ⅛) corresponding to the third encrypted data $e_C$ to the processing unit 23D-4.

The processing unit 23D-2 receives the first inference result and the second inference result ($e_A$, ⅛) output based on the first encrypted data and the first inference result and the second inference result ($e_A$, ¼) output based on the second encrypted data, executes the reduction-to-common-denominator process between the received results, and outputs the execution result to the processing unit 23D-3. More specifically, the processing unit 23D-2 determines the multipliers (multiplier for the reduction-to-common-denominator) for the respective second inference results (corresponding to the numerators) to perform the reduction-to-common-denominator process so that the first inference results (corresponding to the denominators) of the two pieces of input data are set as same value, sets the same value as the first inference results regarding the respective first inference results, executes the calculation in the ciphertext space corresponding to the calculation of multiplying the plaintext data by the multiplier for the reduction-to-common-denominator regarding the respective second inference results of the two pieces of input data, and sets the results as the respective second inference results in the present processing unit. In the present example, the processing unit 23D-2 determines the multiplier for the reduction-to-common-denominator to be 1 regarding ($e_A$, ⅛) which is the first input data, so that the new first inference result and the new second inference become ($e_A$, ⅛). The processing unit 23D-2 determines the multiplier for the reduction-to-common-denominator to be 2 regarding ($e_B$, ¼) which is the second input data, so that the new first inference result and the new second inference become ($e_{2B}$, ⅛).

The processing unit 23D-2 outputs the first inference result and the second inference result (($e_A$, ⅛) and ($e_{2B}$, ⅛)) corresponding to the first and second input data obtained by the reduction-to-common-denominator process to the processing unit 23D-3.

The processing unit 23D-3 performs the process corresponding to the addition process of the plaintext data on the first inference result and the second inference result (($e_A$, ⅛) and ($e_{2B}$, ⅛)) corresponding to the first and second encrypted data. The processing unit 23D-3 sets the result ($e_{A+2B}$ in this example) of executing the calculation (multiplication of the encrypted data in the present example) in the ciphertext space corresponding to the addition of the plaintext data on the second inference result of the two pieces of input data as a new second inference result and outputs the first inference result and the second inference result ($e_{A+2B}$, ⅛) to the processing unit 23D-4.

The processing unit 23D-4 receives the first inference result and the second inference result ($e_{A+2B}$, ⅛) output from the processing unit 23D-3 and the first inference result and second inference result ($e_C$, ⅛) corresponding to the third encrypted data output from the processing unit 23D-1, executes the reduction-to-common-denominator process between the received results, and outputs the execution result to the processing unit 23D-5. More specifically, the processing unit 23D-4 determines the multipliers (multiplier for the reduction-to-common-denominator) for the respective second inference results (corresponding to the numerators) to perform the reduction-to-common-denominator so that the first inference results (corresponding to the denominators) of the two pieces of input data are set as same value, sets the same value as the first inference results regarding the respective first inference results, executes the calculation in the ciphertext space corresponding to the calculation of multiplying the plaintext data by the multiplier for the reduction-to-common-denominator regarding the respective second inference results of the two pieces of input data, and sets the results as the respective second inference results in the processing unit. In the present example, the processing unit 23D-4 determines the multiplier for the reduction-to-common-denominator to be 1 regarding ($e_{A+2B}$, ⅛) which is one piece of input data, so that the new first inference result and the new second inference become ($e_{A+2B}$, ⅛). The processing unit 23D-4 determines the multiplier for the reduction-to-common-denominator to be 1 regarding ($e_C$, ⅛) which is the other piece of input data, so that the new first inference result and the new second inference result becomes ($e_C$, ⅛). The processing unit 23D-4 outputs the two first inference results and the two second inference results (($e_{A+2B}$, ⅛) and ($e_C$, ⅛)) obtained by the reduction-to-common-denominator process to the processing unit 23D-5.

The processing unit 23D-5 performs the process corresponding to the addition process of the plaintext data on the two first inference results and the two second inference results (($e_{A+2B}$, ⅛) and ($e_C$, ⅛)) input from the processing unit 23D-4. The processing unit 23D-5 sets the result ($e_{A+2B+C}$ in this example) of executing the calculation (multiplication of the encrypted data in the present example) in the ciphertext space corresponding to the addition of the plaintext data on the second inference result of the two pieces of input data as a new second inference result and outputs the first inference result and the second inference result ($e_{A+2B+C}$, ⅛) to the client device 30A through the inference result transmission unit 29.

In the client device 30A, the decryption unit 38 decrypts the second inference result from the first inference result and the second inference result ($e_{A+2B+C}$, ⅛) received from the inference device 20D, and outputs the decrypted second inference result (A+2B+C) and the first inference result to the reflection processing unit 39A.

The reflection processing unit 39A generates an inference result ((A+2B+C)/8 in the present example) reflecting the first inference result by multiplying the second inference result (A+2B+C in the present example) of the plaintext data received from the decryption unit 38 by the first inference result (⅛ in the present example). As a result, the client device 30A can obtain the same value as the execution result of executing the processes of the processing units 13C-1 and 13C-2 of the learning device 10C on the plaintext data.

Next, a processing system according to a fifth modified example will be described.

Figure 13:
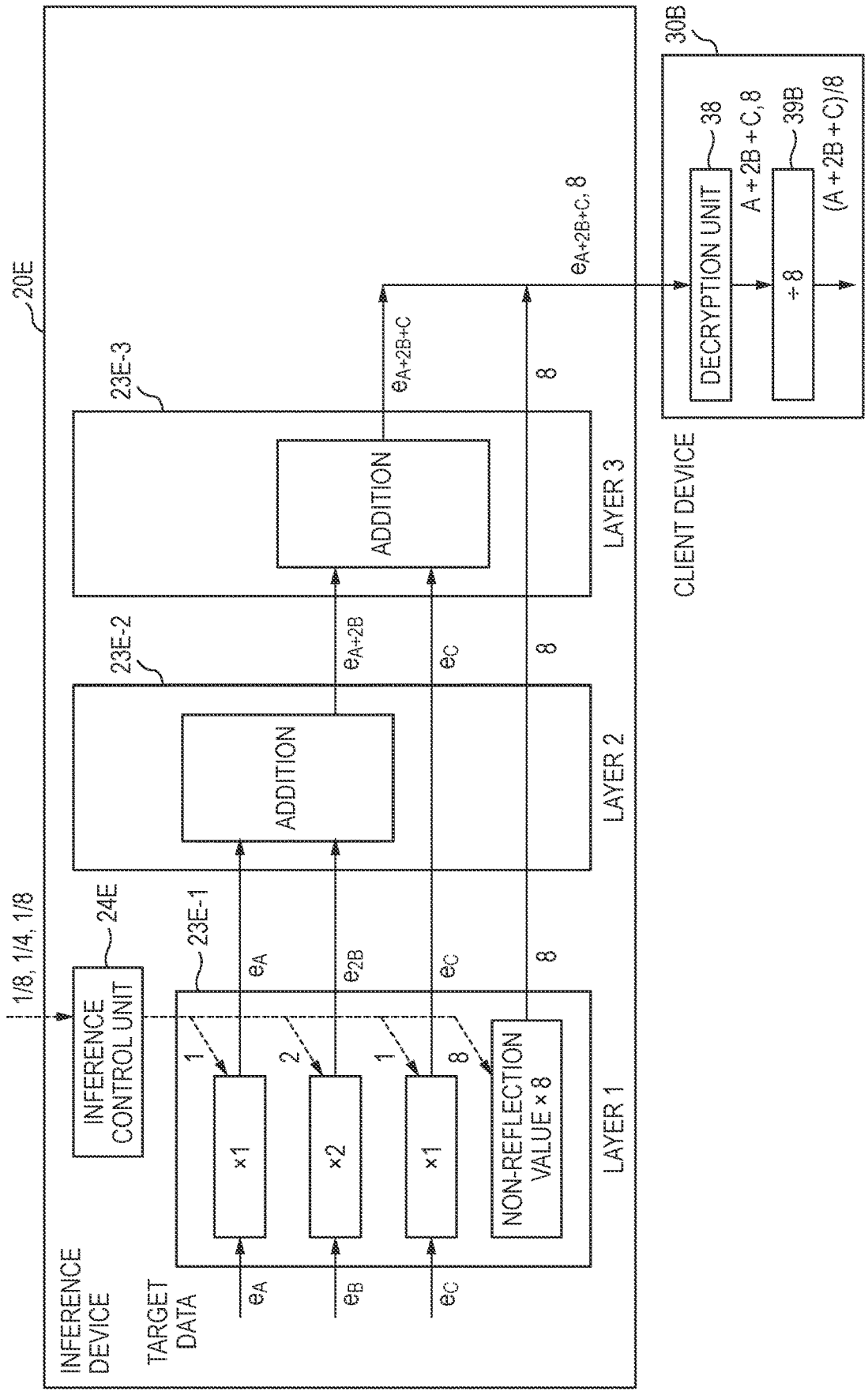
FIG. 13 is a functional configuration diagram illustrating an inference device and a client device of a processing system according to a fifth modified example.

FIG. 13 is a functional configuration diagram of an inference device and a client device of a processing system according to the fifth modified example.

The processing system according to the fifth modified example includes an inference device 20E instead of the inference device 20D in the processing system according to the fourth modified example illustrated in FIG. 12 and a client device 30B instead of the client device 30A. The same components as those of the above-described embodiment and the first to fourth modified example are denoted by the same reference numerals, and redundant description is omitted.

The inference device 20E includes an inference control unit 24E, a processing unit 23E-1 of a processing layer 1, a processing unit 23E-2 of a processing layer 2, and a processing unit 23E-3 of a processing layer 3. In the present example, the processing layer 1 of the learning device 10C corresponds to the processing layer 1 of the inference device 20E, and the processing layer 2 of the learning device 10C corresponds to the processing layers 2 and 3 of the inference device 20E.

The inference control unit 24E performs reduction-to-common-denominator on a plurality of setting values of multiplication for the same processing unit, sets a component corresponding to the denominator of the result of the reduction-to-common-denominator as a component (first multiplier component) that is not to be used as a target (calculation execution target) to be used in the calculation for the encrypted data and sets the numerator (integer) after the reduction-to-common-denominator as a component (second multiplier component) that is to be used as a calculation execution target. Therefore, in the present example, the inference control unit 24E sets the processing unit 23E-1 so as to calculate the non-reflection value (first calculation result) by multiplying a non-reflection value (initial value of a non-reflection value (for example, 1) in a case where there is no input from the preceding stage), which is plaintext data from the preceding stage, by the common denominator when performing the reduction-to-common-denominator on the setting values of the multipliers. In the embodiment, the processing unit 23E-1 is set so as to calculate a common one first calculation result for a plurality of the outputs. In the present example, the non-reflection value is used as a value to be finally divided. The inference control unit 24E sets a process using the value corresponding to each numerator after the reduction-to-common-denominator to the processing unit 23E-1 so that the calculation in the ciphertext space in the processing unit 23E-1 corresponds to the multiplication of each numerator after the reduction-to-common-denominator in the plaintext space. The processing unit 23E-1 set in this manner calculates the non-reflection value (first calculation result) by multiplying the non-reflection value of the initial value by the denominator. The processing unit 23E-1 calculates the second calculation result by performing the calculation in the ciphertext space corresponding to the calculation of multiplication of the plaintext data by using the corresponding numerator (integer) after the reduction-to-common-denominator as a multiplier regarding each of the plurality of pieces of input encrypted data. The processing unit 23E-1 outputs one non-reflection value (first calculation result) in association with a plurality of the second calculation results corresponding to the respective input data to the subsequent stage.

In the present example, the inference control unit 24E sets the multiplier (second multiplier component) to be used for the calculation of the first encrypted data to 1, sets the multiplier (second multiplier component) to be used for the calculation of the second encrypted data to 2, sets the multiplier (second multiplier component) to be used for the calculation of the third encrypted data to 1, and sets the multiplier (first multiplier component) for the non-reflection value to 8 regarding the processing unit 23E-1.

In the present example, the processing unit 23E-1 calculates $e_A$ by cumulatively multiplying the input first encrypted data $e_A$ by the set multiplier (once in the present example), calculates $e_{2B}$ by cumulatively multiplying the input second encrypted data $e_B$ by the set multiplier (twice in the present example), and calculates $e_C$ by cumulatively multiplying the input third encrypted data $e_C$ by the set multiplier (once in the present example). The processing unit 23E-1 calculates 8 as the first inference result by multiplying the initial value (for example, 1) of the non-reflection value by the denominator (8 in the present example). Then, the processing unit 23E-1 outputs the second inference results ($e_A$, $e_{2B}$, $e_C$) and the first inference results (8) corresponding to the respective input data.

The processing unit 23E-2 performs the calculation in the ciphertext space corresponding to the addition process of the plaintext data regarding the second inference results ($e_A$, $e_{2B}$) corresponding to the first and second encrypted data, sets the result ($e_{A+2B}$ in the present example) as a new second inference result, and outputs the second inference result obtained from the calculation, the second inference result ($e_C$) regarding the input third encrypted data, and the input first inference result (8) to the processing unit 23E-3.

The processing unit 23E-3 performs the calculation in the ciphertext space corresponding to the addition process of the plaintext data regarding the second inference result ($e_{A+2B}$) obtained by the calculation in the processing unit 23E-2 and the second inference result ($e_C$) corresponding to the third encrypted data, sets the result ($e_{A+2B+C}$) as a new second inference result, and outputs the second inference result and the input first inference result (8) to the client device 30B by the inference result transmission unit 29.

In the client device 30B, the decryption unit 38 decrypts the second inference result among the first inference result and the second inference result ($e_{A+2B+C}$, 8) received from the inference device 20E and outputs the decrypted second inference result (A+2B+C) and the first inference result to the reflection processing unit 39B.

The reflection processing unit 39B generates an inference result (A+2B+C)/8 in the present example) reflecting the first inference result by dividing the second inference result (A+2B+C in the present example) of the plaintext data received from the decryption unit 38 by the first inference result (8 in the present example). As a result, the client device 30B can obtain the same values as the execution result of executing the processes of the processing units 13C-1 and 13C-2 of the learning device 10C on plaintext data.

In the encryption processing system according to the modified example, when performing multiplication on a plurality of pieces of encrypted data, a common denominator in multiplication is managed as a non-reflection value, so that, in the case of executing a calculation on the ciphertext space corresponding to addition of the plaintext data on these data, it is not necessary to execute a reduction-to-common-denominator process (for example, the process in the processing unit 23D-2 in FIG. 12), and it is possible to reduce a processing load and a processing time.

The present invention is not limited to the above-described embodiments and the modified examples, but can be appropriately modified and implemented without departing from the spirit of the present invention.

For example, the neural network model used in a learning device and an inference device is not limited to the above-described embodiments. The neural network model may include more processing layers or a processing layer configured to execute a processing different from those described in the above-described embodiments.

In the above-described embodiments, the example applied to a processing apparatus that executes a process using a neural network model is described, but the present invention is not limited thereto. For example, the present invention may be similarly applied to a processing apparatus that executes a process without using a neural network model.

In the above-described embodiments, as an example of homomorphic encryption, additive homomorphic encryption is taken, but the present invention is not limited thereto. Completely homomorphic encryption or somewhat homomorphic encryption may be exemplified.

In the above-described embodiments, at least a portion of the functional units configured by executing the program by the CPU 101 of the learning device 10 (or the learning device 10B, 10C), the inference device 20 (or the inference devices 20A-20E), or the client device 30 (or the client devices 30A-30C) may include another processor or a hardware circuit for executing a specific process. The processing unit 13 including the GPU 103 of the learning device 10 (or the learning device 10B, 10C) may include the CPU 101, or may include another hardware circuit. The processing unit 23 including the GPU 103 of the inference device 20 (or the inference devices 20A-20E) may include the CPU 101 or may include another hardware circuit.

In the above-described embodiments, the example where the reception unit 28 is taken as an example of the input unit that receives the target data is described, but the present invention is not limited thereto. For example, the input unit may be a reader/writer that reads out the target data from a recording medium that stores the target data or may be a camera that captures image data that becomes the target data.

In the above-described embodiments, the example where the learning device 10 (or the learning device 10B, 10C) and the inference device 20 (or the inference devices 20A-20E) are configured as separate hardware is described, but the present invention is not limited thereto. The learning device and the inference device may be configured by the same hardware.

In the above-described embodiments, the example where the inference device 20 (or the inference devices 20A-20E) and the client device 30 (or the client devices 30A-30C) are configured as separate hardware is described, but the present invention is not limited thereto. For example, if the process capability of the client device 30 is sufficient, the inference device 20 (or the inference devices 20A-20E) and the client device 30 (or the client devices 30A-30C) may be configured by a same hardware.

What is claimed is:

1. A processing apparatus comprising:
   at least one non-transitory storage device configured to store one or more programs; and
   at least one hardware processor configured to execute the one or more programs and control the processing device to function as:
      an input unit that receives input of encrypted data, which is encrypted using homomorphic encryption; and
      a process execution unit that executes a predetermined process by using the encrypted data while maintaining a secret state by encryption and to include one or more processing units, wherein
   at least one of the processing units is a multiplication corresponding processing unit for executing a calculation corresponding to a processing of multiplying plaintext data by a predetermined multiplier,
   the multiplication corresponding processing unit generates a first calculation result using a first multiplier component of the predetermined multiplier, the first multiplier component being a component that is not used in a calculation of encrypted data,
   the multiplication corresponding processing unit generates a second calculation result by executing a calculation to encrypted data input in a ciphertext space corresponding to multiplication of the plaintext data by a second multiplier component of the predetermined multiplier, the second multiplier component being a component other than the first multiplier component, and
   the multiplication corresponding processing unit outputs the first calculation result and the second calculation result in association with each other such that there is an indication of a mathematical relationship between the first calculation result and the second calculation result.

2. The processing apparatus according to claim 1, wherein,
   in a case where the first calculation result is input from a preceding stage, the multiplication corresponding processing unit generates the first calculation result by multiplying the first calculation result input by the first multiplier component.

3. The processing apparatus according to claim 1, wherein
   the multiplication corresponding processing unit executes calculations to each of a plurality of pieces of the encrypted data, the calculations corresponding to the process of multiplying by the predetermined multiplier, and
   the multiplication corresponding processing unit outputs a plurality of second calculation results corresponding to the plurality of pieces of the encrypted data input from the preceding stage in association with the first calculation result.

4. The processing apparatus according to claim 2, wherein
   the multiplication corresponding processing unit executes calculations to each of a plurality of pieces of the encrypted data, the calculations corresponding to the process of multiplying by the predetermined multiplier, and
   the multiplication corresponding processing unit outputs a plurality of second calculation results corresponding to the plurality of pieces of the encrypted data input from the preceding stage in association with the first calculation result.

5. The processing apparatus according to claim 1, wherein the first multiplier component is a component of the predetermined multiplier to be used as a divisor.

6. The processing apparatus according to claim 2, wherein the first multiplier component is a component of the predetermined multiplier to be used as a divisor.

7. The processing apparatus according to claim 3, wherein the first multiplier component is a component of the predetermined multiplier to be used as a divisor.

8. The processing apparatus according to claim 4, wherein the first multiplier component is a component of the predetermined multiplier to be used as a divisor.

9. The processing apparatus according to claim 5, wherein the first multiplier component is a component of the predetermined multiplier to be used as a divisor.

10. The processing apparatus according to claim 1, wherein
    at least one of the processing units is an addition corresponding processing unit for executing a calculation corresponding to a processing of addition of plaintext data, and,
    when executing a calculation corresponding to addition of plaintext data to a plurality of pieces of the encrypted data, the addition corresponding processing unit specifies a multiplier in a calculation of the plaintext data to which at least one piece of encrypted data is to be adjusted to have a first calculation result associated with one piece of the encrypted data and a first calculation result associated with another piece of the encrypted data to have a same value, executes a calculation corresponding to a multiplication of the plaintext data by the specified multiplier to each of the plurality of pieces of the encrypted data to obtain a plurality of second calculation results, executes a calculation corresponding to the addition of the plaintext data to the plurality of second calculation results, outputs the result of the calculation of the plurality of second calculation results, and outputs the same value as the first calculation result.

11. A processing method by a processing apparatus for executing a predetermined process by using encrypted data, which is encrypted using homomorphic encryption as an input while maintaining a secret state by encryption, the processing apparatus including at least one non-transitory storage device configured to store one or more programs and at least one hardware processor configured to execute the one or more programs and control the processing device to perform the processing method comprising:
    in executing a calculation corresponding to a processing of multiplying plaintext data by a predetermined multiplier, generating a first calculation result using a first multiplier component of the predetermined multiplier, the first multiplier component being a component that is not used in a calculation of encrypted data, generating a second calculation result by executing a calculation to encrypted data input in a ciphertext space corresponding to multiplication of the plaintext data by a second multiplier component of the predetermined multiplier, the second multiplier component being a component other than the first multiplier component, and outputting the first calculation result and the second calculation result in association with each other such that there is an indication of a mathematical relationship between the first calculation result and the second calculation result.

12. A non-transitory computer readable storage medium storing a processing program causing a computer to execute a process, for executing a predetermined process by using encrypted data, which is encrypted using homomorphic encryption as an input while maintaining a secret state by encryption to execute the process, the process including:

in executing a calculation corresponding to a processing of multiplying plaintext data by a predetermined multiplier, generating a first calculation result using based on a first multiplier component of the predetermined multiplier, the first multiplier component being a component that is not used in a calculation of encrypted data, generating a second calculation result by executing a calculation to encrypted data input in a ciphertext space corresponding to multiplication of the plaintext data by a second multiplier component of the predetermined multiplier, the second multiplier component being a component other than the first multiplier component, and outputting the first calculation result and the second calculation result in association with each other such that there is an indication of a mathematical relationship between the first calculation result and the second calculation result.

13. An encryption processing system comprising:

a processing apparatus for executing a predetermined process by using encrypted data, which is encrypted using homomorphic encryption as an input while maintaining a secret state by encryption; and a result generation apparatus for executing a process for generating a result corresponding to plaintext data by using a processing result by the processing apparatus as an input, wherein the processing apparatus includes at least one non-transitory storage device configured to store one or more programs; and at least one hardware processor configured to execute the one or more programs and control the processing device to function as:

an input unit that receives the encrypted data, and a process execution unit that executes the predetermined process by using the encrypted data and to include one or more processing units at least one of which is a multiplication corresponding processing unit for executing a calculation corresponding to a process of multiplying the plaintext data by a predetermined multiplier, the multiplication corresponding processing unit generating a first calculation result using a first multiplier component of the predetermined multiplier, the first multiplier component being a component that is not used in a calculation of encrypted data, generating a second calculation result by executing a calculation to encrypted data input in a ciphertext space corresponding to multiplication of the plaintext data by a second multiplier component of the predetermined multiplier, the second multiplier component being a component other than the first multiplier component, and outputting the first calculation result and the second calculation result in association with each other such that there is an indication of a mathematical relationship between the first calculation result and the second calculation result, and the result generation apparatus includes at least one non-transitory storage device configured to store one or more programs; and at least one hardware processor configured to execute the one or more programs and control the result generation apparatus to function as:

a processing result reception unit that receives the processing result including a first processing result and a second processing result from the processing apparatus, a decryption unit that decrypts the second processing result, and a reflection processing unit that executes a reflection process for reflecting the first processing result on the plaintext data decrypted by the decryption unit.

* * * * *